US011629482B2

(12) United States Patent
Carrington et al.

(10) Patent No.: US 11,629,482 B2
(45) Date of Patent: Apr. 18, 2023

(54) TRANSPORTABLE MODULAR WATER VAPOR CONDENSATION APPARATUS

(71) Applicant: Ashera Holdings LLC, Reno, NV (US)

(72) Inventors: Robert G. Carrington, Reno, NV (US); Thomas William Cox, Coquitlam (CA)

(73) Assignee: Ashera Holdings LLC, Reno, NV (US)

(*) Notice: Subject to any disclaimer, the term of this patent is extended or adjusted under 35 U.S.C. 154(b) by 50 days.

(21) Appl. No.: 16/645,607

(22) PCT Filed: Sep. 13, 2018

(86) PCT No.: PCT/US2018/050914
§ 371 (c)(1),
(2) Date: Mar. 9, 2020

(87) PCT Pub. No.: WO2019/055676
PCT Pub. Date: Mar. 21, 2019

(65) Prior Publication Data
US 2020/0277761 A1    Sep. 3, 2020

Related U.S. Application Data

(60) Provisional application No. 62/558,718, filed on Sep. 14, 2017.

(51) Int. Cl.
E03B 3/28        (2006.01)
B01D 5/00       (2006.01)
(52) U.S. Cl.
CPC .............. E03B 3/28 (2013.01); B01D 5/0009 (2013.01); B01D 2259/4541 (2013.01); B01D 2259/4566 (2013.01)

(58) Field of Classification Search
None
See application file for complete search history.

(56) References Cited

U.S. PATENT DOCUMENTS 4,212,656 A    7/1980  Lube
4,299,599 A   11/1981  Takeyama et al.
(Continued)

FOREIGN PATENT DOCUMENTS

CN    101775824 A    7/2010
CN    101812857 A    8/2010
(Continued)

OTHER PUBLICATIONS

Extended European Search Report on corresponding European application (EP 18857227.5) from European Patent Office dated Mar. 5, 2021.
(Continued)

Primary Examiner — Christopher P Jones
Assistant Examiner — Phillip Y Shao
(74) Attorney, Agent, or Firm — KOS IP Law LLP

(57) ABSTRACT

Apparatus for producing liquid water from the condensation of atmospheric water vapor includes a transportable housing defining a first air inlet, a second air inlet, and an air outlet; first and second doors operable selectively to open and close the first and second air inlets, respectively; and at least one water condensation unit located in the housing between the first air inlet and the air outlet, and between the second air inlet and the air outlet. The housing is configured so that, when at least one of the first and second air inlets is open, at least a portion of an air flow into the at least one open air inlet is passed through the at least one condensation unit and out the air outlet.

10 Claims, 12 Drawing Sheets

(56) References Cited

U.S. PATENT DOCUMENTS

| | | | |
|---|---|---|---|
| 5,357,764 A | 10/1994 | Dickman | |
| 5,961,697 A * | 10/1999 | McManus | B01D 53/0438 96/152 |
| 6,251,172 B1 * | 6/2001 | Conrad | C02F 9/005 96/136 |
| 9,212,668 B2 * | 12/2015 | Deng | F04D 25/166 |
| 9,441,892 B2 * | 9/2016 | Lowe | B60K 11/04 |
| 2002/0189273 A1 | 12/2002 | Tani et al. | |
| 2004/0040322 A1 | 3/2004 | Engel et al. | |
| 2004/0244398 A1 | 12/2004 | Radermacher et al. | |
| 2005/0044862 A1 | 3/2005 | Vetrovec et al. | |
| 2006/0279167 A1 | 12/2006 | Turner, Jr. | |
| 2007/0028769 A1 | 2/2007 | Eplee et al. | |
| 2008/0041569 A1 * | 2/2008 | Kennon | F04D 29/582 165/122 |
| 2011/0296858 A1 | 12/2011 | Caggiano | |
| 2012/0102929 A1 * | 5/2012 | Beissler | F01N 13/002 60/297 |
| 2014/0116870 A1 * | 5/2014 | Kamen | B01D 1/0035 202/83 |
| 2014/0147313 A1 * | 5/2014 | Deng | H05K 7/20172 417/423.15 |
| 2015/0033774 A1 | 2/2015 | Ferreira et al. | |
| 2015/0047963 A1 | 2/2015 | Roch et al. | |
| 2016/0030858 A1 | 2/2016 | Giacomimi | |
| 2017/0247862 A1 | 8/2017 | Giacomini | |
| 2018/0127954 A1 * | 5/2018 | Bravo | B01D 46/0036 |
| 2018/0127956 A1 * | 5/2018 | Amaral | F25D 21/14 |

FOREIGN PATENT DOCUMENTS

| | | |
|---|---|---|
| CN | 107012917 | 8/2017 |
| CN | 113123406 A | 7/2021 |
| DE | 10346644 | 5/2005 |
| JP | S60153901 A | 8/1985 |
| TW | 201827775 A | 8/2018 |
| WO | WO2016185236 | 11/2016 |

OTHER PUBLICATIONS

International Search Report on corresponding PCT application (PCT/US2018/050914) from International Searching Authority (USPTO) dated Nov. 8, 2018.

Written Opinion on corresponding PCT application (PCT/ US2018/050914) from International Searching Authority (USPTO) dated Nov. 8, 2018.

Statista, Container Shipping—Statistics & Facts, The Statistics Portal, Jun. 25, 2017; Retrieved on Oct. 19, 2018; Retrieved from the Internet: <URL: https://web.archive.org/web/20170625182621/https://www.statista.com/topics/1367/container-shipping/> entire document.

* cited by examiner

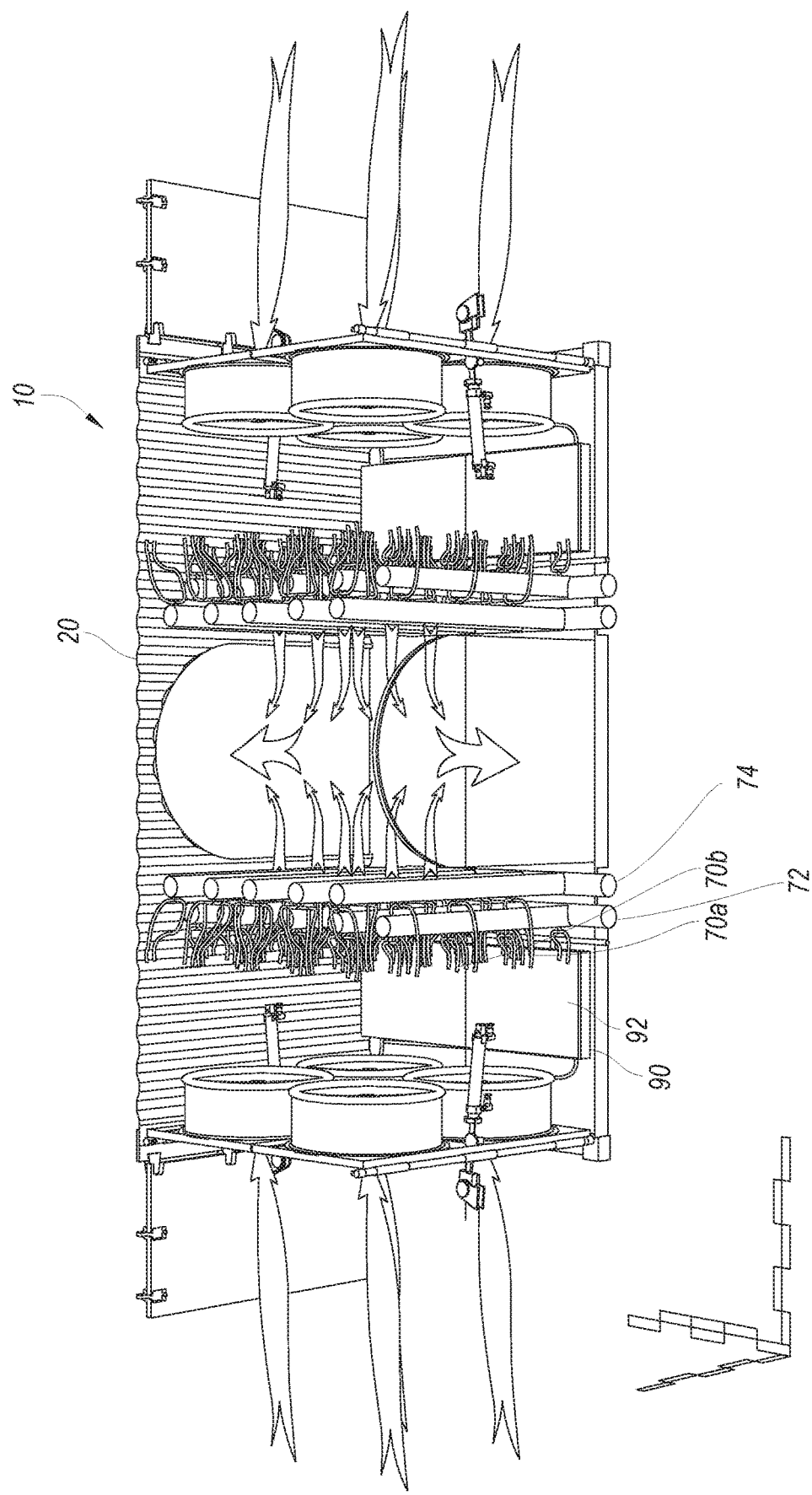

TRANSPORTABLE MODULAR WATER VAPOR CONDENSATION APPARATUS

CROSS-REFERENCE TO RELATED APPLICATIONS

This application is the National Phase, under 35 U.S.C. § 371(c), of International Application No. PCT/US2018/050194, filed Sep. 13, 2018, which claims the benefit, under 35 U.S.C. § 119(e), of U.S. Provisional Application No. 62/558,718, filed Sep. 14, 2017, the disclosures of all of the referenced applications are incorporated herein by reference in their entirety.

FEDERAL SPONSORED RESEARCH OR DEVELOPMENT

Not applicable.

BACKGROUND

This disclosure relates to the field of the recovery of fresh water by the condensation of atmospheric water vapor. More specifically, it relates to a water condensation apparatus that is transportable and installable in discrete modules, whereby a scalable water recovery station comprising a desired number of modules can be set up at a desired location. In some embodiments, the location may be fixed on land, while in other embodiments the location may be a floating platform (e.g. a vessel) or a fixed platform on a body of water.

Large areas of the earth's surface, on which hundreds of millions of people live, suffer from a shortage of fresh water. Indeed, the shortage of clean, fresh water is considered by some experts to be the single most important environmental concern. Many solutions to this problem have been proposed, but none have been found to be practical or cost effective on a large scale with current technology. Other approaches are constantly being sought.

One potential source of fresh water that has, perhaps, not attracted the attention it deserves is atmospheric water vapor. The earth's atmosphere is estimated to contain approximately $3 \times 10^{15}$ liters of water as vapor, which is continuously replenished and is equivalent to the needs of the earth's entire population for over two and a half years. Furthermore, the capacity of atmospheric air to hold water vapor increases exponentially with temperature. In warmer and more humid geographic areas, air near the earth's surface may hold more than 50 grams of water vapor per cubic meter. Recovery of even a small percentage of this vapor as liquid water in the present disclosure would yield enormous benefits.

SUMMARY

Broadly, a water vapor condensation apparatus in accordance with the present disclosure comprises a condensation module including a housing containing a condensing unit operable to cool moisture-laden atmospheric air below its ambient dew point, thereby condensing the water vapor in the air into liquid water. The condensing unit includes one or more condensing chambers, each comprising a pre-cooling section and a condensing section. Condensed water from the condensing unit is directed to a fresh water collection device, preferably after processing by filtration and/or purification devices. The housing is configured to direct the atmospheric air through the condensing unit in an efficient manner, so as to optimize the condensation effect. The apparatus further includes a mechanism for circulating the cooled and dehumidified air within the housing to maintain the ambient temperature inside the condenser housing within a desired range. The housing may range in size in a variety of configurations from small to very large. In one embodiment, the housing is configured and dimensioned as a standard ship-board cargo container, so as to be compatible with commonly-used container handling and transportation equipment. The housing is advantageously configured for modular assembly into a multi-unit array, whereby the apparatus can be scaled up for larger volumes of fresh water production.

BRIEF DESCRIPTION OF THE DRAWINGS

FIG. 11 shows a schematic cut away showing a partial view of an embodiment of the water condensation module including the coolant system.

DETAILED DESCRIPTION

The detailed description set forth below in connection with the appended drawings is intended as a description of the presently preferred embodiments of water condensation modules, assemblies, and components in accordance with aspects of the disclosed apparatuses and methods, and it is not intended to represent the only forms in which the explicitly and implicitly described components, assemblies, and methods may be constructed or utilized. The description sets forth the features and the steps for constructing and using the embodiments of the present components, assemblies, and method in connection with the illustrated embodiments. It is to be understood, however, that the same or equivalent functions and structures may be accomplished by different embodiments that are also intended to be encompassed within the spirit and scope of the present disclosure. As denoted elsewhere herein, like element numbers are intended to indicate like or similar elements or features.

Figure 1:
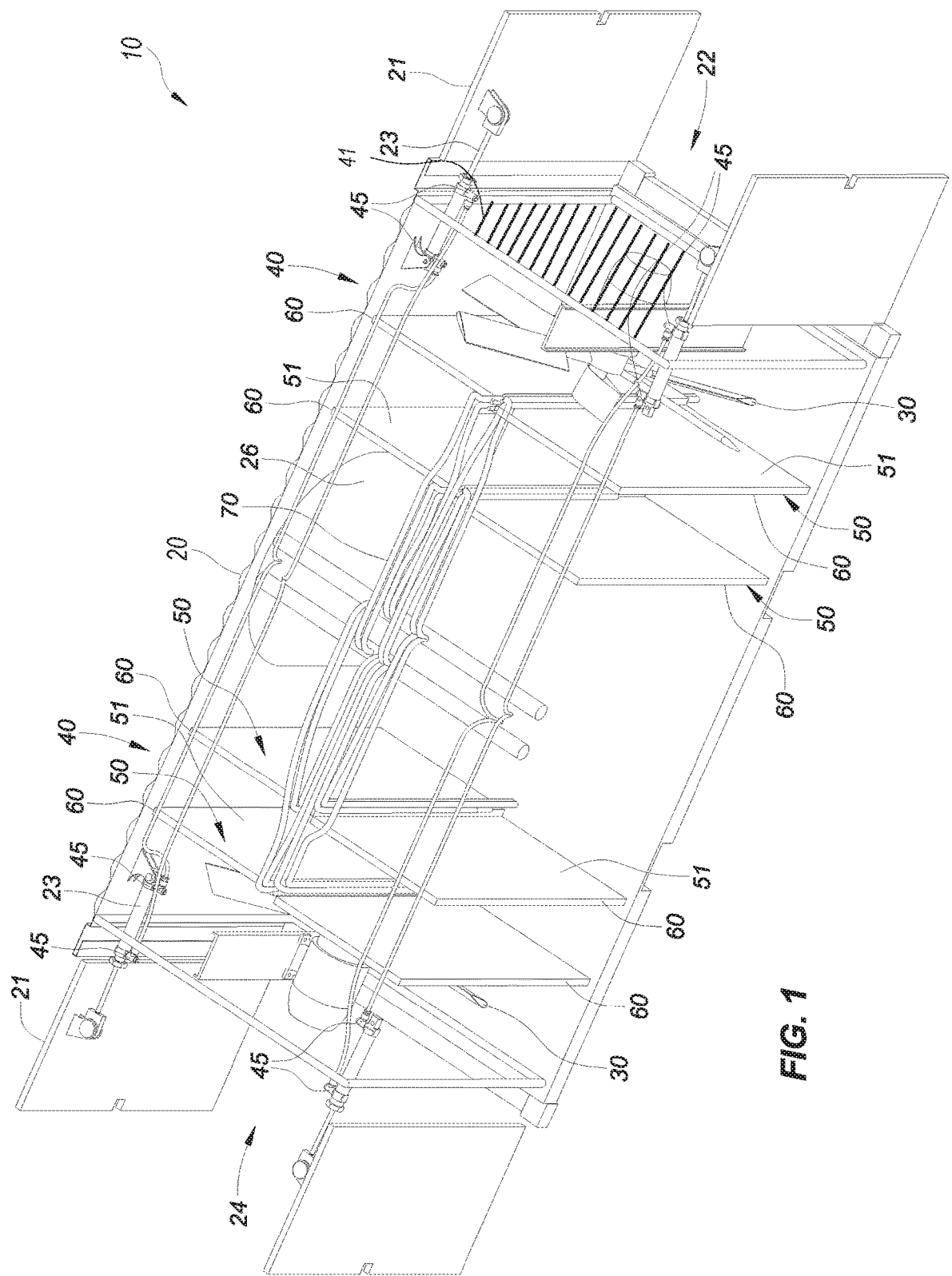
FIG. 1 shows a cut-away view of a water condensation module in accordance with an embodiment of the apparatus disclosed herein.

FIG. 1 shows a water condensation apparatus 10, or water production module, in accordance with one embodiment of the present disclosure. The water condensation module or apparatus 10 includes a housing 20 and one or more condensing units 40 located within the housing 20 through which warm moist air will pass to be chilled to or below its ambient dew point, causing fresh, liquid water to condense. The condensate will then be directed to storage or filtering and/or processing apparatus for bottling or other similar uses.

The housing 20 may advantageously be configured and dimensioned so as to be compatible with common cargo container handling and transportation equipment. The housing 20 may, for example, conform to standard sea cargo container dimensions with external dimensions of 8 feet (2.4 meters) wide by 8.5 feet (2.9 meters) high, and 20 to 40 feet (6.1 to 12.2 meters) long, and approximate interior dimensions of 7 feet 8 inches (2.3 meters) wide, 7 feet 10 inches (2.4 meters) high, and 19 feet 4 inches (5.9 meters) long. The housing 20 may conform to the standardized Twenty foot Equivalent Unit (TEU) standard container size utilized in international shipping standards. Thus, in accordance with this aspect, the housing 20 may be manufactured in any of the facilities already producing standard cargo containers, thereby minimizing fabrication, construction, and handling costs while maximizing compatibility with existing global port infrastructure and transportation configurations. As shown, the housing 20 has the shape of a rectangular box. The housing 20 may, however, assume other shapes, such as a cylinder, a pyramid, or a trapezoidal box, for example.

The housing 20, in the illustrated rectangular embodiment, has a top side, a bottom side, a front side, and a rear side, all extending between a first open end 22 and an opposite second open end 24. The first open end 22 can be a first inlet opening and the second open end 24 can be a second inlet opening. In FIG. 1, a top side of the housing 20 and a front side of the housing 20 are removed to better illustrate and describe components located inside the housing 20. A door assembly is advantageously provided at each of the open ends 22, 24 to controllably close the first and second open ends 22, 24.

In some embodiments, as shown, each door assembly comprises a pair of doors 21 pivotably attached (as by hinges) to opposite sides of the first and second ends 22, 24 of the housing 20. The doors 21 can be operated remotely or automatically by actuator devices 23 for transition between an open position and a closed position. The actuator devices can include hydraulic or pneumatic devices, or equivalents. As shown in FIG. 1, the doors 21, when in the open position, allow warm moist atmospheric air to be drawn inside the housing 20 through the first and second open ends 22, 24 so as to flow through a plurality of condensing units 40. The condensing units 40 chill the air to or below its ambient dew point to condense the water vapor in the air into liquid water condensate as it passes through the condensing units 40, or condensation units. As described below, the condensing units 40 can be arranged in a variety of configurations, including being arranged perpendicular to or at an acute angle to the air flow into the housing 20. The cooled air is circulated in the housing 20 to maintain a desired temperature in the housing 20, and/or it exits the housing 20 through an outlet or exhaust tunnel 26, as explained in further detail below. In the closed position, the doors 21 close the opposite ends of the housing 20, thereby covering the first and second open ends 22, 24 to protect the condensing units 40 and other components inside the housing 20 from hazards and environmental conditions when not in use. Although an assembly of two doors 21 is shown at each of the first and second open ends 22, 24 of the housing 20, a single folding door, a roll up door, a sliding door, or other means to cover and protect the open ends 22, 24 may be used instead.

The housing 20 can be positioned relative to the wind to provide a flow of warm moist air into at least one of the first open end 22 and the second open end 24, and out through the outlet 26. As shown in FIG. 1, the outlet 26 is centrally located and extends through opposite sides of the housing 20 between the first and second ends 22, 24. Thus, the flow of the cooled air out of the housing 20 is perpendicular to the flow of warm moist air inside the housing 20. The cooled air can flow in opposite directions out of the housing 20 or flow in one direction through an exhaust tunnel forming the outlet 26. The outlet 26 is an opening with a cross-sectional area sufficient to exhaust chilled air from which moisture has been condensed. In a specific example, the outlet 26 may have a diameter of about 2.5-3.0 meters, with a perimeter spaced from a top side and a bottom side of the housing 20 to maintain structural rigidity of the housing 20. Alternatively, the outlet 26 can be U-shaped with vertical sides extending from the bottom side of the housing 20 and a semi-cylindrical top portion spaced from the top side of the housing 20.

In another embodiment, one of the first opening 22 and the second opening 24 may serve as the air inlet, and the other as the air outlet. The condensation apparatus 10 can be positioned so that the wind can feed warm moist air into the housing 20 through whichever of the openings 22, 24 is the inlet, and the cooled air can flow out the other of the openings 22, 24 and/or the exhaust outlet 26.

When no wind is present or the airflow of the warm, moist air passing through the condensing units 40 is inadequate, the natural airflow from the wind can be mechanically augmented, or an artificial air flow mechanically created, by one or more ventilation devices, such as fans 30, located within the housing 20 and operable to pull the warm moist air into the housing 20 and force the warm moist air through the condensing units 40. The fans 30 can be located inside the housing 20 at or near one, or preferably both, of the first and second open ends 22, 24, and they can be powered by a power supply (not shown), such as, for example, batteries, an external electrical power supplied to the condensing apparatus 10, an on-board generator or by direct mechanical drives such as belts or pulleys driven by external mechanical means such as wind, wave or internal combustion engine. By pulling the warm, moist air into the housing 20 with the fans 30 and forcing the air towards the condensing units 40, the warm, moist air between the fans 30 and the condensing units 40 is under compression, thereby reducing its ability to carry water vapor. Thus, the fans 30 can increase the yield of liquid water condensate by not only drawing in warm, moist air through the first and second open ends 22, 24, but also by compressing the moist air. In one embodiment, the air velocity may be about 2.5 m/sec through the condensing units 40. The warm, moist air between the first and second open ends 22, 24 and the condensing units 40 may be understood as being upstream of the condensing units 40, while the air that has moved past the condensing units 40 in the housing and between the first and second open ends 22, 24 and the outlet 26 may be understood as being downstream of the condensing units 40.

A filter 41 may optionally be provided upstream of the fans 30 at the first open end 22 and second open end 24 to prevent debris and other large objects from entering the housing 20, without restricting the flow of moist air into the housing 20. In one example, the filter is a tight mesh like screen arranged just inside or at the first open end 22 and the second open end 24 so that the debris can drop from the filter under its own weight. Alternatively, the filter and an optional secondary filter (not shown) can be provided between each fan 30 and adjacent condensing unit 40. The fans 30 may also be operated in reverse periodically or when needed to assist in clearing the debris from the filters.

The condensing units 40 are located inside the housing 20 between the first and second open ends 22, 24 and the outlet 26. In one embodiment, the condensing units 40 are located between the fans 30 and the outlet 26. Said differently, the outlet 26 of the housing 20 is preferably located between the condensing units 40 so that the flow of air passing through the condensing units 40 can exit the housing 20.

Each condensing unit 40 comprises a pre-cooling section 45 and a condenser section 50 downstream of the pre-cooling section 45. That is, the pre-cooling section 45 of the condensing unit 40 is located between the path of the airflow of the moist air between the fan 30 and the condenser section 50. Each pre-cooling section 45 may advantageously comprise multiple atomizing nozzles (not shown) arranged to spray a mist of cooled water into the incoming air stream to reduce the temperature of the warm, moist air prior to entering the condenser section 50. Pre-cooling the incoming air stream with cooled water materially enhances the efficiency of the condensing section 50 by reducing the air temperature and increasing the relative humidity, preferably to or near 100%, thereby reducing the moisture-carrying capacity of the incoming air and increasing condensate yield. The cooled water can be a portion of the condensate produced from the condenser section 50 that is recirculated and pumped through the pre-cooling section 45. Thus, the pre-cooling section 45 can use recirculated cooled water instead of water pumped from outside of the housing 20. Cooled water recaptured with the newly condensed water and the unused portion of the condensate may be collected and directed into a storage system (not shown) outside of the housing 20. Alternatively, a land-based apparatus (not shown) may pump in cooling water from an external source (not shown), such as a tank or a reservoir.

Figure 7:
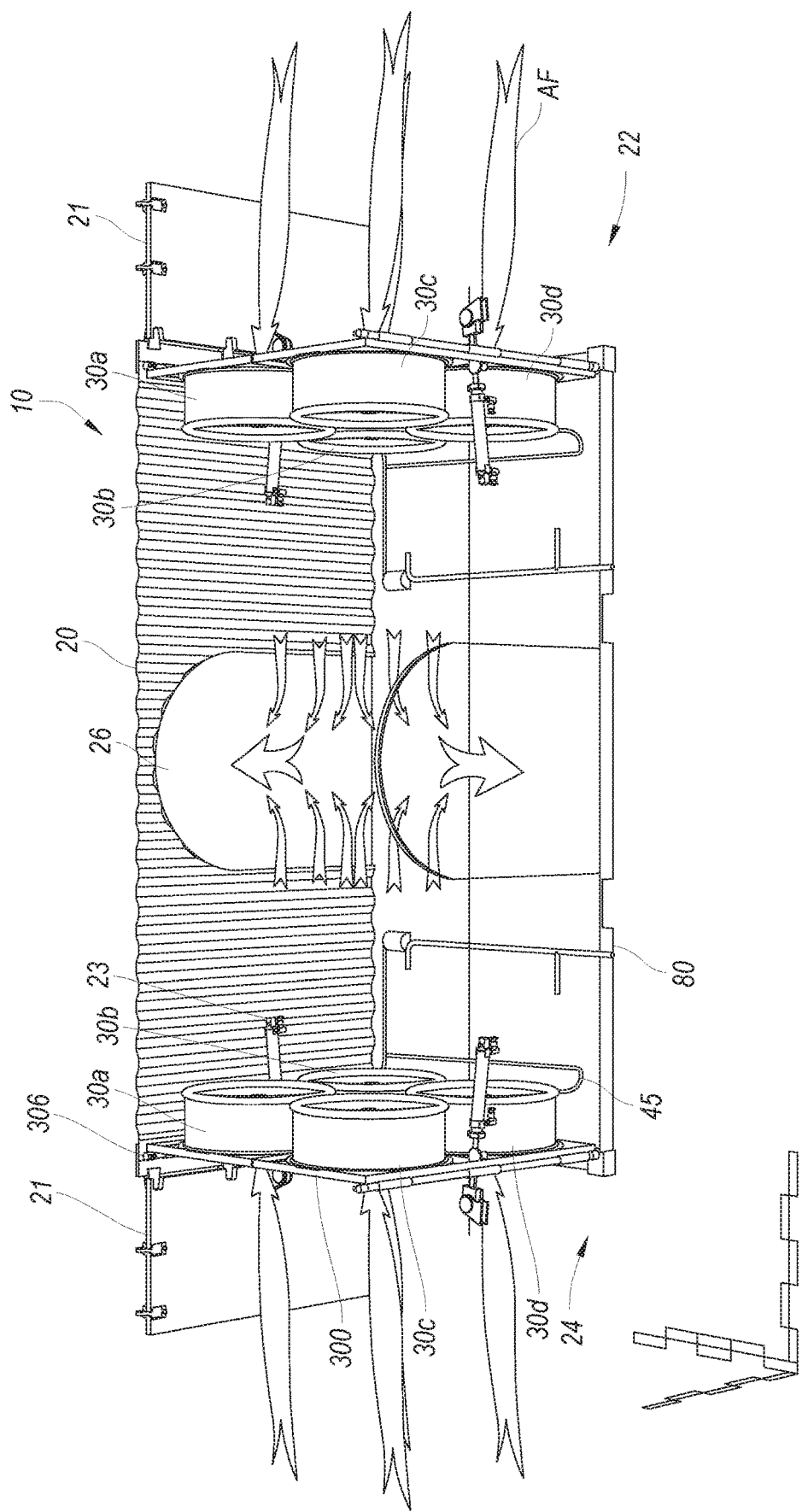
FIG. 7 shows an exemplary schematic cut away showing a partial view of an embodiment of the water condensation module having a plurality of fans at each of the ends of the housing.

In one embodiment, each pre-cooling section 45 can comprise one or more pipes joined together alongside a perimeter of the condenser section 50 (see, e.g., FIG. 7). Holes or atomizing nozzles (not shown) may be spaced apart along the pipes and directed for spraying atomized cooled water into the incoming air flow prior to entering the condenser section 50 to reduce the temperature and moisture-carrying capacity of the incoming air. In another embodiment, atomizing nozzles can be placed at a top of the housing 20, or they may form a ring adjacent to the entrance to the condenser section 50.

The condenser section 50 comprises a plurality of condensers 51 each having a plurality of condensing surfaces. The cooling for the condensers 51 can be provided by various means including, individually or in combination, modified refrigeration, evaporative cooling, solar heating/refrigeration, and circulating refrigerant, the condensed water, or cold, deep sea-water. Heat is removed from the moist air passing over the condensing surfaces, so that the air is cooled below its dew point, thereby causing atmospheric water vapor to condense as liquid water on the condensing surfaces and flow into a specially designed collection apparatus for collection, as discussed further below. In one example, the temperature of the warm moist air entering the apparatus 10 can be about 30° C., and cooled to about 10° C. or less after passing through the condensers and out the outlet 26, depending on the condenser configuration and the cooling mechanism.

The condensers 51 may assume a variety of configurations, such as finned, thermo-syphon, heat pipe, or refrigeration. One exemplary configuration includes an array of fins 52 (see FIG. 6) and/or tubes as condensing surfaces. The condensing fins or tubes are arranged in a vertical array to promote condensate discharge. In either case, the spacing between the condensing surfaces in the array, and the overall dimensions of the array, are advantageously selected to minimize "blinding" by condensate accumulating between adjacent condensing surfaces, which impedes air flow and thus reduces condensate formation.

Figure 6:
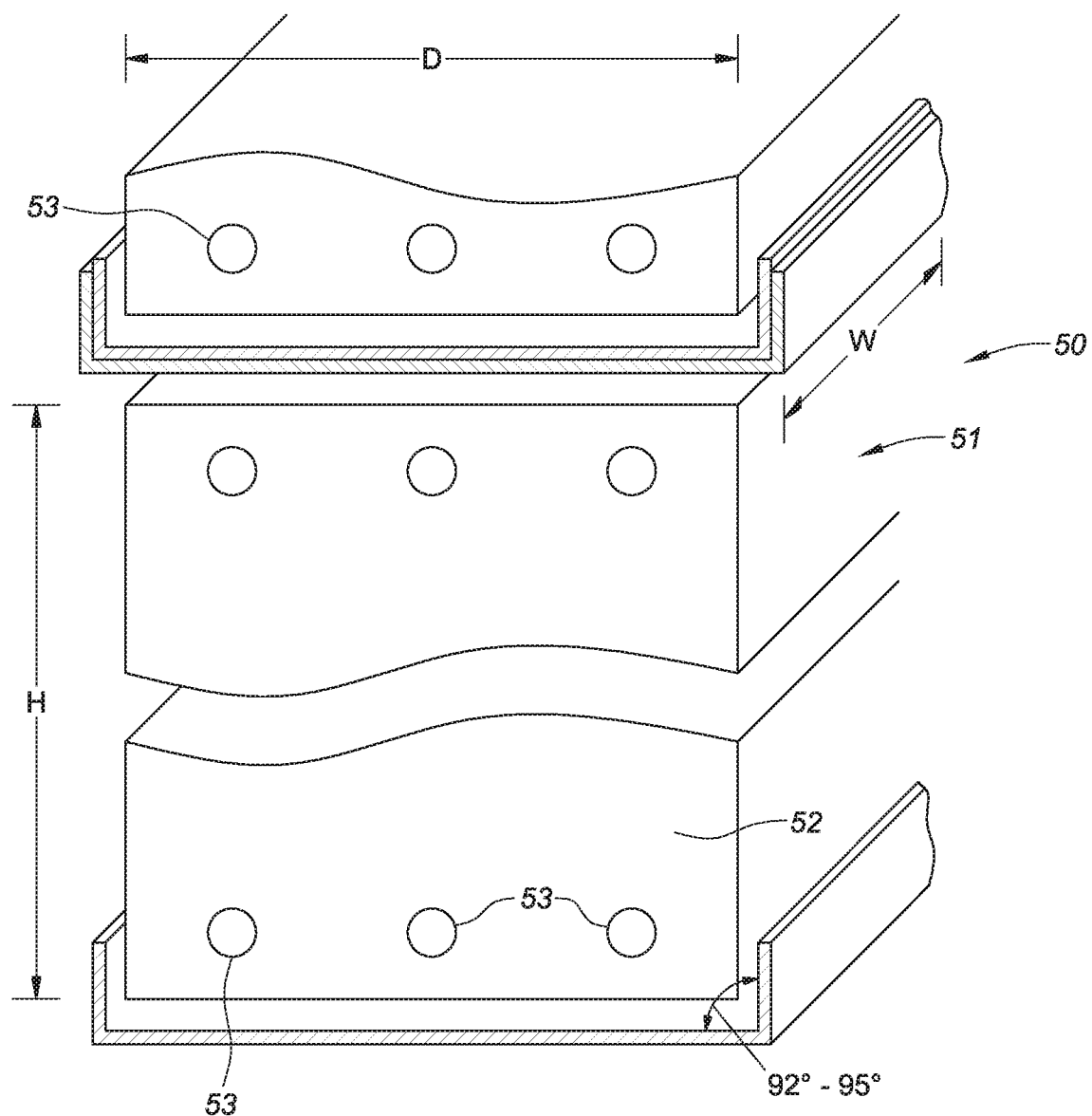
FIG. 6 shows a detailed view of a bank of condensing units stacked on top of one another with a primary water collection mechanism.

With reference to FIG. 6, in one embodiment, for example, the condenser 51 includes an array of condensation fins 52, wherein the height H of the array of condensation fins 52 is preferably not more than about 65-70 cm, and preferably spaced about 2.0-2.5 mm apart. The overall depth D (front-to-back) of the array is preferably not more than about 8-9 cm to avoid excessive air flow resistance. In one configuration, the overall width W of the condenser 51 may advantageously be slightly more than half the internal width of the housing 20. This will allow several condensers 51 to be staggered inside the housing 20, as discussed in detail below with reference to FIG. 2.

Figure 3:
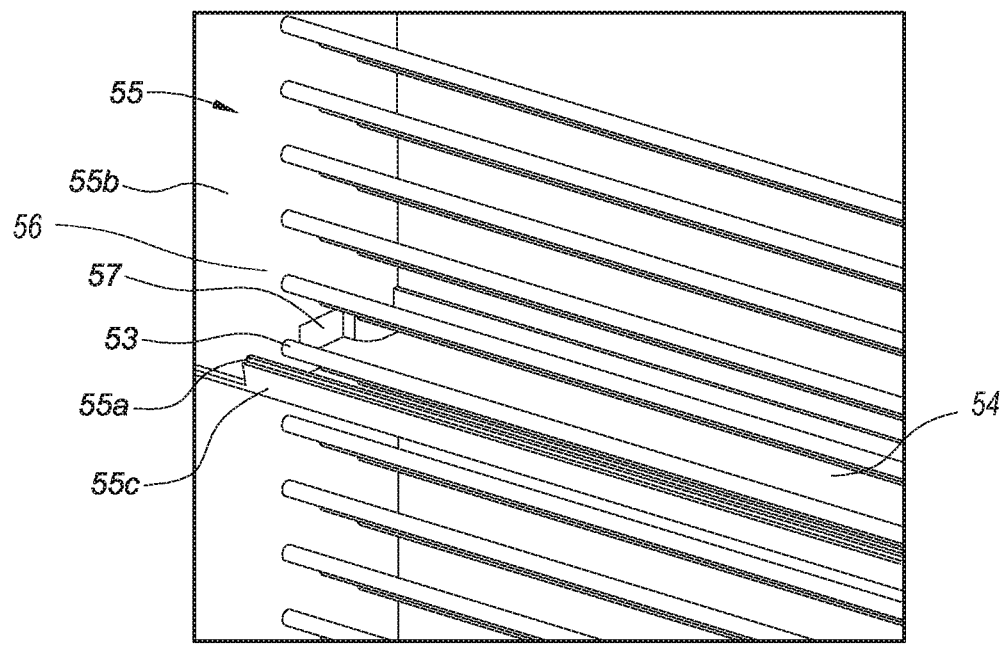
FIGS. 3 and 4 show detailed views of a portion of the condensing unit of FIG. 2.
Figure 4:
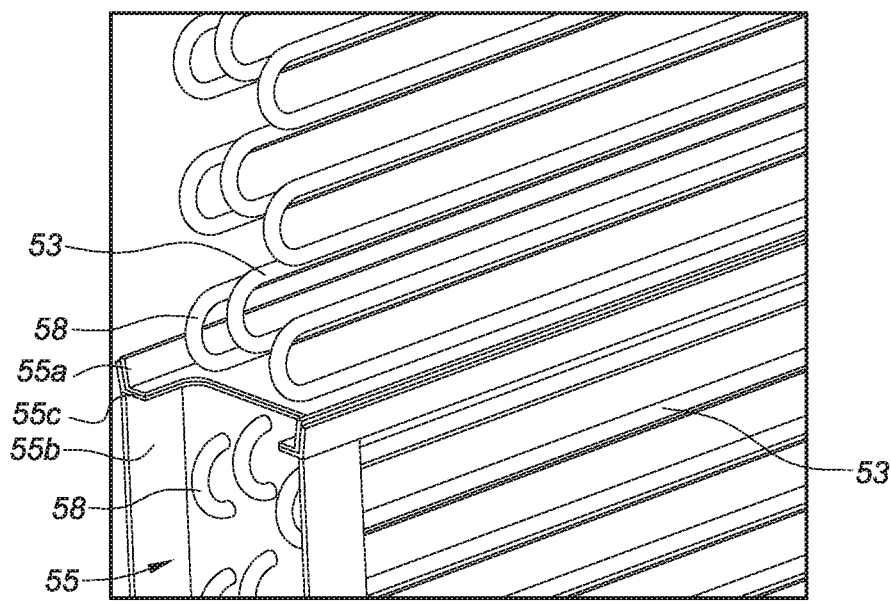

In an exemplary embodiment, the condensation fins 52 are fixed to one or more horizontal cooling tubes or heat pipes 53, as shown in FIGS. 3 and 4, through which a coolant fluid, such as a refrigerant or cold water, is circulated. The cooling tubes 53 are preferably made of a metal with high thermal conductivity, such as, for example, copper. The cooling tubes 53 may run through the fins 52 multiple times by looping back and forth across the width of the condenser 51. Alternatively, the cooling tubes 53 may be straight tubes connected together by a connector 58, such as a U-shaped connector 58, attached to an end of two separate cooling tubes 53 just outside a side frame portion 55*b* of a frame 55 of the condenser 51. The tubes 53 connected to each other by each U-shaped connector 58 may be either adjacent to each other or non-adjacent. Thus, the coolant fluid may circulate through one cooling tube 53 after another cooling tube 53 via the U-shaped connector 58. Two or more cooling tubes 53 can thereby be connected in series via the connectors 58 to form a single serpentine tube with an inlet end and an outlet end.

Figure 2:
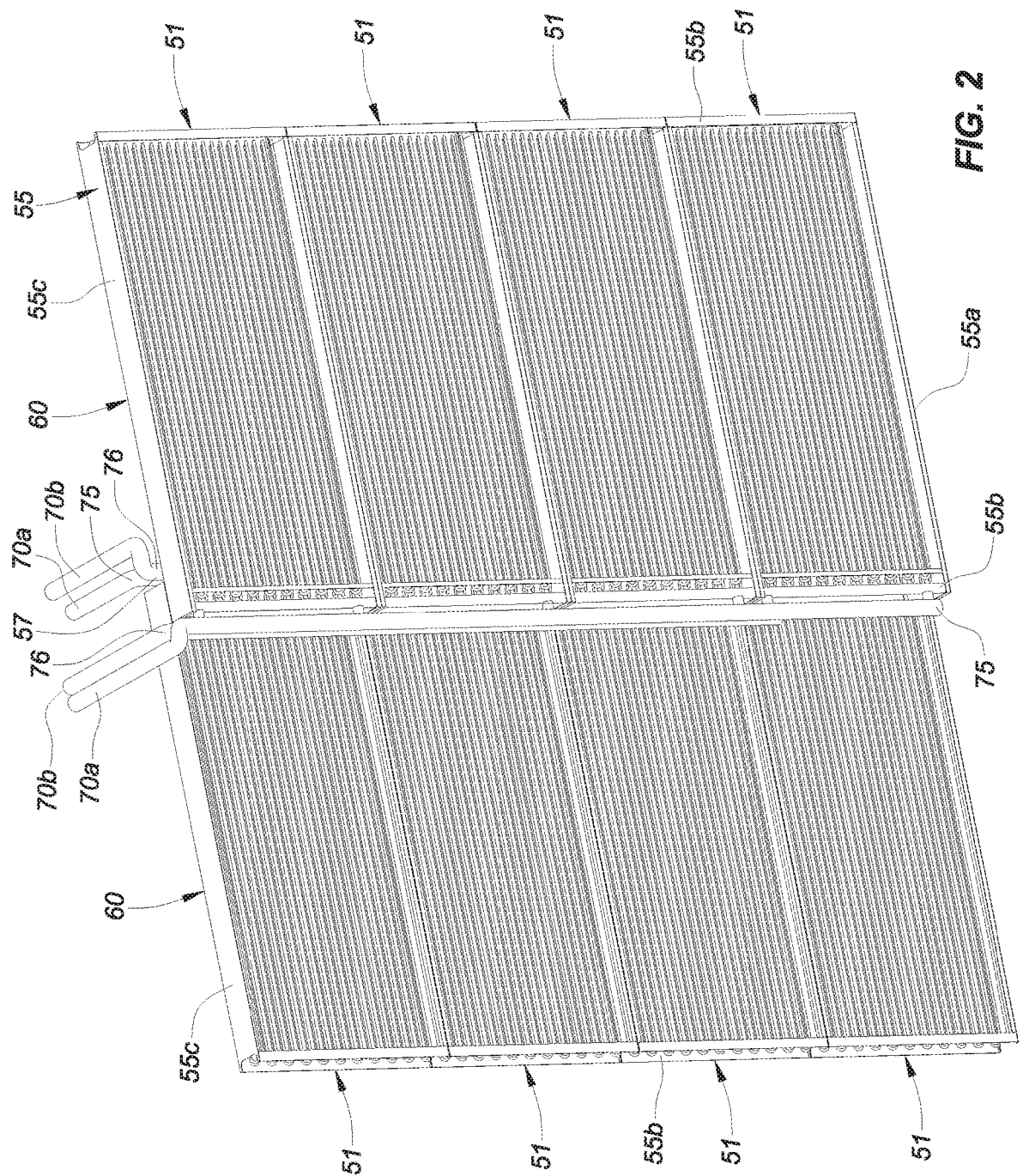
FIG. 2 shows a detailed view of an exemplary condensing unit that may advantageously be used in an embodiment of the disclosure.

With reference to FIG. 2, a coolant system 70 comprises a supply line 70*a* supplying coolant fluid to the condensers 51, and a return line 70*b* returning the coolant fluid after it has circulated through the condensers 51. The supply line 70*a* is connected to a supply tube 75, which in turn, is connected in parallel to the one or more inlet ends of one or more cooling tubes 53 of one or more condensers 51, directly or via a secondary tube (not shown), preferably having an internal diameter between that of the supply tube 75 and the one or more cooling tubes 53. Thus, the supply line 70*a* is able to simultaneously feed coolant fluid to the cooling tubes 53 of the condensers 51 via the supply tube 75. As shown in FIG. 2, four condensers 51 are stacked on top of one another, although the number and arrangement of the condensers 51 may be varied as suitable for each application. Condenser arrangements may vary from nearly perpendicular to the air-flow to acute angles forming a "zigzag" or chevron array, as further described below with respect to FIGS. 15 and 16. Embodiments of a chevron arrangement can increase the condensing surface area and reduce pressure differentials and air flow velocity across the condensing surfaces, thereby increasing production of condensate water as well as increasing structural stability.

The supply tube 75 may extend vertically adjacent the stack of condensers 51, with hard or flexible couplings connected to the one or more inlet ends of each of the condensers 51. Alternatively, the supply tube 75 can be fixed to the one or more inlet ends of the cooling tubes 53 of each of the condensers 51 by welding. The supply tube 75 may have an interior cross-sectional size or interior diameter equal to or greater than an interior cross-sectional size or interior diameter of a single cooling tube 53.

After the coolant fluid in the condensers 51 has drawn heat away from the fins 52 to condense water from the warm, moist air, the warmer coolant fluid returns to the return line 70b of the coolant system 70 through a return tube 76, which is connected in parallel to the one or more outlet ends of the one or more cooling tubes 53 of the one or more condensers, directly or via a secondary tube (not shown), preferably having an internal diameter at least equal to that of the supply tube 75. Thus, the returning coolant fluid may be removed from multiple condensers 51 simultaneously. The return tube 76 may extend vertically adjacent the stack of condensers 51 with hard or flexible couplings connected to the one or more outlet ends of the cooling tubes 53 of each of the condensers 51. Alternatively, the return tube 76 can be fixed to the one or more outlet ends of each of the condensers 51 by welding. The return tube 76 may have a larger interior cross-sectional size or interior diameter equal to or greater than the interior cross-sectional size or interior diameter of a single cooling tube 53. The return tube 76 can be positioned adjacent to the supply tube 75, but it advantageously may be spaced sufficiently far from the supply tube 75 to prevent (or at least minimize) heat transfer from the return tube 76 to the supply tube 75.

The condensers 51 can be any suitable apparatus known in the art. For example, in some embodiments, the condenser 51 or heat exchanger may include thermo-siphons or heat pipes which may be advantageously oriented in the air flow, and may be configured as individual tubular pipes or alternatively as loops. The heat pipes and thermo-syphons may be oriented in a variety of positions ranging from vertical through horizontal and all angles between. Closely spaced fins preferably oriented vertically or nearly so, may be attached to the heat pipes/thermo-syphons to increase the cooling and condensing areas. In one embodiment, the vertically oriented tubular or loop heat pipes or thermo-syphons comprise tubing of about 3-7 mm in diameter, with a flattened or ovoid cross-section however other shapes are contemplated, and may be straight, formed in a helix, twisted or other advantageous shape with spacing about 2.5-3.0 mm, in offset rows no more than about 550 mm high and a working air flow area no more than about 20 cm in depth. The upper end of the heat pipes are embedded in a suitable heat sink which may advantageously consist of a number of materials and configurations including but not limited to a finned metallic heat sink with high thermal conductivity that is cooled by a constant flow of air or water, or in another configuration the upper end of each heat pipe or thermo-syphon is inserted in a container through which a stream of coolant is circulated which may be water or other liquid or gas. The warm moist air flow transfers heat to the heat pipe or thermo-syphon causing the working fluid to vaporize, the vapor then rising to the upper portion of the heat pipe or thermo-syphon where the heat is transferred to the heat sink, causing the working fluid to condense and flow down the tube until it is again vaporized.

In another contemplated configuration, heat pipes or thermo-syphons may be advantageously configured as a loop with any of multiple cross sections, geometric shapes and configurations with the evaporating section of the loop advantageously placed in the flow of warm moist air and the condensing section configured to dissipate heat into a heat sink as previously described or the passing cooled airstream with the evaporation portion of the loop oriented from vertical to horizontal. In one contemplated configuration the loop may be oriented with the evaporator section in a horizontal position, one end of the loop advantageously attached to, or inserted in a suitable heat sink as previously described. Vertically oriented cooling fins may advantageously be employed to increase the cooling and condensing area much in the same manner as the heat exchanger described above. Like the tubular heat pipe or thermo-syphon the loop heat pipe or thermo-syphon removes heat from the passing air stream through the constant evaporation and condensation of a suitable working fluid, transferring the heat to the working fluid for removal. The working fluid within the heat pipes or thermo-syphons can be any of a number of non-corrosive liquids including but not limited to distilled water, a suitable refrigerant or an azeotrope contained at an appropriate pressure or vacuum to facilitate the requisite evaporation and condensation of the working fluid. One non-corrosive positive azeotrope is 95% ethanol and 5% water.

In a refrigeration configuration (not shown), oriented refrigerated condensing coils pass through close-spaced fins or plates arranged vertically within the airflow. The condensing coils, in some embodiments, may be elongate ovals with long straight sides and short curves arranged in a closely spaced arrangement and/or augmented with additional cooling fins or plates arranged to promote the natural flow of condensate to the collection apparatus. The working fluid within the refrigeration coils or plates is a refrigerant.

Hydroscopic coating can be applied on the condensing surfaces to promote water discharge and enhance water production by removing the insulating effect of the condensed water more rapidly. The tubing and cooling surfaces can be made of copper-bismuth alloy to provide the greatest thermal coefficient and chemical resistance. Copper, aluminum, stainless steel and other highly conductive materials may also be used. A very hydroscopic, corrosion resistant "diamond like" carbon can be used as a coating. Diamond-like carbon can reduce friction and provide corrosion and wear resistance.

With reference to FIGS. 2, 3, 4, and 6, a frame 55 surrounding the condenser 51 can serve as a collection apparatus for collecting and directing flow of the condensate. To minimize corrosion, the frame 55 can be made of, or coated with, an appropriate corrosion resistant material. Each condenser 51 can act as a principal collection point for the produced condensate. Furthermore, the frame 55 can provide for easy installation, maintenance, removal, and replacement of the condenser 51. In a number of embodiments, the frame 55 may comprise a bottom frame portion 55a, a pair of side frame portions 55b, and a top frame portion 55c that collectively form a rectangular frame 55.

The condenser 51 may include one or more horizontal collection channels 54, each with an opening facing upward to collect the condensate flow from the condenser surfaces of the condenser 51 into the collection channel under gravity. The side frame portions 55b can form an outwardly-facing vertical channel. When placed against a wall of the housing 20, the side frame portions 55b of each of the condensers 51 stacked on top of one another can collectively form a rectangular collection passage or channel 56 running vertically along the side of the housing 20. An alternative configuration utilizing a zig-zag pattern arrangement can have a suitable end-cap (not shown) placed over the converging ends of the condenser to form a similar collection passage as further described below with respect to FIGS. 11-16. The top frame portion 55c can form an upwardly-facing channel. The bottom frame portion 55a may also form an upwardly-facing collection channel to direct the flow of condensate through a plurality of collection ports 57 (as described below) into a collection passage 56 or conduit defined between the stacked side frame portions 55b and the wall of the housing 20. The channel of the top frame portion 55c can be slightly wider than the bottom frame portion 55a, so that when one condenser 51 is stacked atop another condenser 51, the bottom frame portion 55a of a first condenser 51 can nest inside the channel of the top frame portion 55c of a second condenser 51 to form a multi-condenser array, as shown, for example, in FIGS. 2 and 6. The sides of the channel of the bottom frame portion 55a may be flared outwardly at 92°-95° with respect to the channel bottom. This allows the bottom frame portion 55a to form an interference fit with the top frame portion 55c when stacking the condensers. Thus, the bottom frame portion 55a can be wedged inside the top frame portion 55c.

The collection ports 57 at a bottom or end of each frame 55 direct the flow of condensate from the collection channels 56 into the collection passage or conduit, through which the condensate flows (either gravitationally, or by means of a pump, not shown) to a collection tray (See FIG. 11, condensate collection tray 92) which serves to collect condensate and direct it via porting and plumbing to one or more collection tanks or reservoirs. The collection ports 57 can be drilled or milled through the side frame portions 55b to direct the condensate flow into the collection passage or conduit. Air pressure from incoming air flow can assist in moving the condensate through the collection ports 57 and into the collection passage or conduit.

With reference to FIG. 2, in some embodiments, several condensers 51 may be mounted together to form a bank 60 of condensers 51 stacked on top of one another. For example, in one specific exemplary embodiment, the bank 60 of condensers may be a stack four condensers high, with two banks arranged side by side spaced from each of the first and second open ends 22, 24 of the housing 20. Rather than abutting the two banks 60 end to end or in a planar orientation, the banks 60 of condensers 51 may be arranged such that the leading side of the condenser 51 on one side of the bank 60 of condensers 51 sits directly behind the trailing side of an adjacent bank 60 of condensers 51 on the other side of the condenser 51 to provide flexibility in the manufacturing and assembly of the banks 60, and flexibility during storage, transit, and operation of the banks 60 inside the housing 20. The banks 60 can be arranged in a staggered arrangement. This allows the vertical supply tube 75 and the vertical return tubes to be assembled close to the longitudinal center plane of the housing.

Embodiments of the banks 60 of condensers 51 can be arranged in a chevron arrangement, wherein a bank of condensers is at an oblique angle relative to an adjacent bank of condensers. In this way, the chevron arrangement provides for an accordion type arrangement, or an arrangement similar to the folds in a coffee filter. A chevron arrangement can increase the effectiveness of the condensers. Additional details of embodiments of the chevron arrangement are described below with respect to FIGS. 15 and 16.

In the various arrangements of the condenser section 50, the banks of condensers can be mounted on collection pans or trays, which can serve to collect condensate, direct condensate into collection channels, support condenser banks, provide critical space and access for piping and plumbing, and assist in controlling air flow.

The bank 60 of condensers 51 can be mounted on rails (not shown) for easy accessibility to the condensers 51 for maintenance, removal, and replacement. Advantageously, in some embodiments, each bank 60 of condensers 51 may be located approximately 60 cm from an end of the housing 20, and about 30 cm from the exhaust tunnel or outlet 26. The banks 60 may be removably fixed to the housing 20 by brackets or stabilizing rails (not shown) on the interior of the bottom side or floor of the housing 20 and the interior of the front and rear sides of the housing 20. The brackets may also serve to align the banks 60 inside the housing 20. For example, the brackets can be L-shaped brackets with holes or slots to fasten the bracket to an inside floor of the housing 20. The brackets may then be fastened to the bank 60, or the bank 60 may be sandwiched between two brackets to secure the bank to the floor and front/back side of the housing 20.

The above-described coolant system 70 for supplying cooling fluid to the condensers 51 and returning warmed fluid from the condensers 51 may advantageously comprise both rigid and flexible plumbing elements (e.g., tubes and conduits). Rigid plumbing elements, such as metal or PVC pipes, can be placed inside the housing 20 close to a centerline of the housing 20 to save piping and plumbing costs, and to protect the coolant system from damage. A combination of rigid plumbing and flexible plumbing, including pipes, hoses, and quick disconnect couplings, can be placed outside the housing connecting to the rigid plumbing inside the housing 20. Pumps (not shown) can be provided inside or outside of the housing 20 to circulate the cooling fluid into the housing 20 to the bank 60 of condensers 51, and then back out the housing 20.

A collection piping system 80 (see FIG. 5), serving as a condensate outlet, may also comprise rigid and flexible plumbing elements to deliver condensate out of the housing 20 and into a storage unit (not shown), such as a tank or reservoir. In some embodiments, the condensate may be directed to a purification apparatus or device (not shown) before entering the storage tank or reservoir. Rigid plumbing elements (e.g., metal or PVC pipes) can be provided inside the housing 20, and a combination of hard plumbing and flexible plumbing, comprising pipes, hoses, and quick disconnect couplings can be provided outside the housing 20. Pumps (not shown) can be located inside or outside the housing 20 to pump the condensate out of the housing 20 to a water storage facility or a water-using system or apparatus.

Electrical power to operate the condensing units (pumps, fans 30, pre-cooling sections 45, diagnostic equipment, and other equipment) can be provided by renewable energy sources, including wind, photo-voltaic elements, ocean current, and ocean thermal energy conversion. Alternatively, as mentioned above, batteries and/or generators can be used instead of, or as supplements to, the renewable energy sources.

Figure 5:
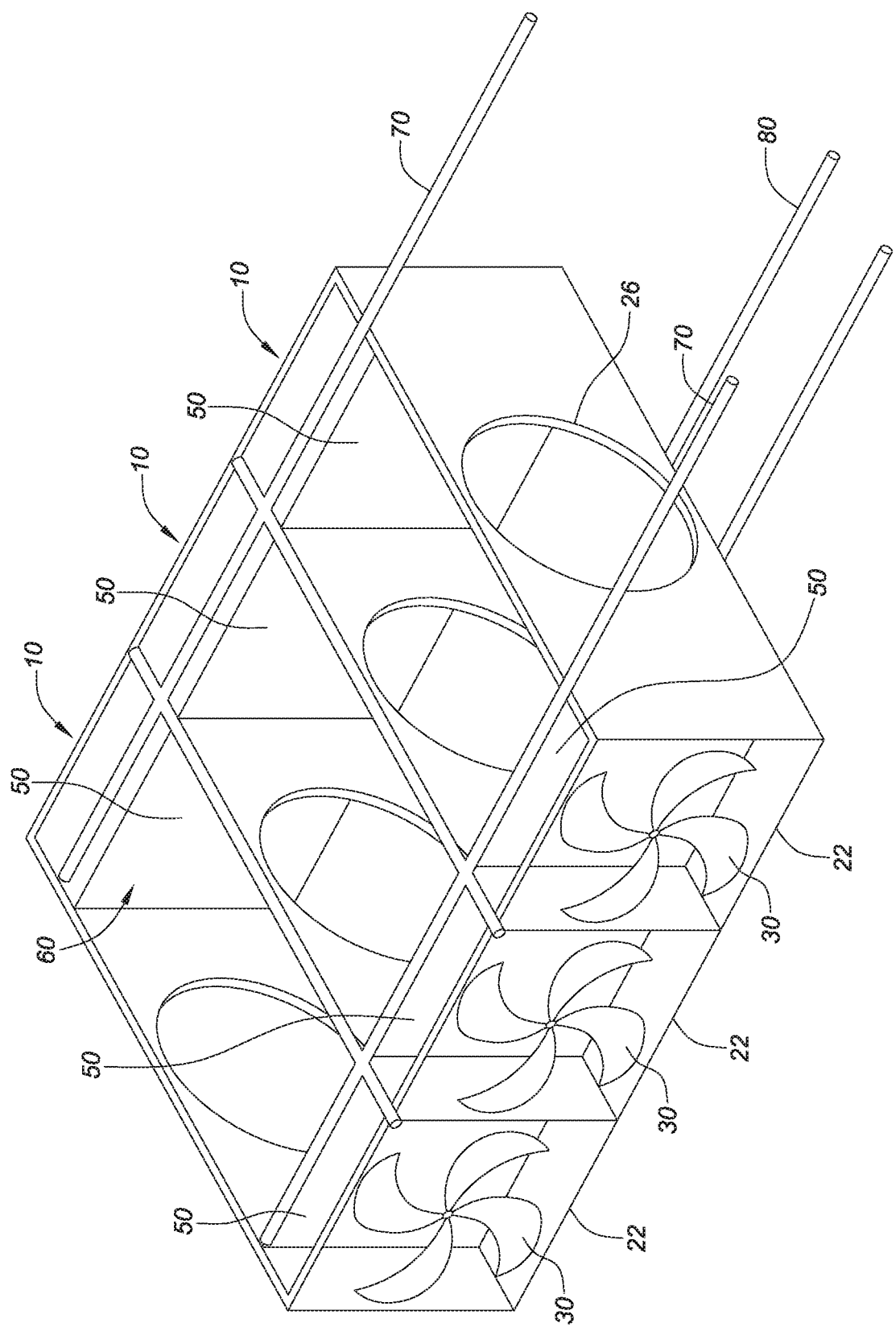
FIG. 5 shows a semi-diagrammatic view of an arrangement of several condensation modules in a multi-module array.

As will be appreciated from the above, the apparatus of the present disclosure is advantageously configured as a self-contained water condensation module that lends itself for installation in a multi-module array or combination, as shown in FIG. 5. Thus, a plurality of water condensation modules 10 can be arranged individually or in a matrix or array stacked vertically or side-by-side, on land or on a marine vessel or platform. When stacked side-by-side, the exhaust tunnels 26 of the separate modules are advantageously aligned with each other, as shown.

As noted above, the water condensation apparatus 10, either singly or in a modular array as shown in FIG. 5, can be installed on a marine vessel, which can be a conventional container ship, holding up to its TEU capacity. For example, a common Panamax class container vessel has a capacity to carry 2500-5000 containers, which, under typical conditions, may be able to produce over 18 million gallons of water condensate per day.

FIG. 7 illustrates an exemplary schematic cut away showing a partial view of the water condensation module 10, showing a plurality of fans 30a, 30b, 30c, 30d at each of the open ends 22, 24 of the housing 20. For the sake of clarity, FIG. 7 does not show the condensing section 50 or coolant system 70 components of the module, which are shown and described with respect to FIGS. 8-16 below. FIG. 7 shows the fans 30 mounted on a pair of pivoting fan mounting panels 300 at each end 22, 24 of the housing 20. In the illustrated embodiment, two fans 30 are fixed to each fan mounting panel 300, an embodiment of which is further described below with respect to FIGS. 8A and 8B. In this way, servicing can be done by removal of a pair of fans attached to a single fan mounting panel 300, rather than by removing all the fans at one end simultaneously, or by removing a single large fan at each end.

The pivoting fan mounting panels 300 can each be rotatably attached to the housing 20 by way of a mounting bar 306, as further described below with respect to FIG. 9. The mounting bar 306 can be fixed to the housing 20, such that the fan mounting panel 300 can be rotatable relative to the housing 20. Alternatively, as described further below with respect to FIG. 9, the mounting bar 306 can be rotatably mounted to the housing 20. In such a case, the mounting bar 306 and the fan mounting panel 300 can be rotatable relative to the housing 20.

As discussed above, the doors 21, operated by the actuator devices 23, are movable between an open position and a closed position. With the doors 21 open, air flow AF can enter the housing 20 from one or both of the first and second open ends 22, 24 towards the center of the housing 20. At least a portion of the air flow AF can then exit through at least one outlet 26 on the front or the back side of the housing 20, after having been cooled by condenser section 50 as described above.

In some embodiments of the actuator devices 23, such as shown in FIG. 7, the actuator devices 23 may have to cross a plane defined by the pivoting fan mounting panels 300. In order to maximize efficiency of the water condensation apparatus 10 and prevent leakage of cooled air out towards the first and second ends 22, 24, the fan mounting panels 300 can each have a cut out and a flexible seal or boot (not shown) to allow the actuator device 23 to pass through while maintaining a seal between the fan mounting panels 300 and the housing 20. The flexible boot can allow for sufficient movement for the actuator devices 23 to operate between the open position and the closed position of the doors 21 while maintaining a comparatively air tight seal.

Embodiments using a plurality of relatively small fans 30a, 30b, 30c, 30d at each of the ends 22, 24 may be advantageous in certain situations. Besides potentially lowering initial construction costs compared to larger fans, and allowing continued operation of the apparatus in the event of a fan failure, other possible advantages include a smaller power draw on start-up compared to a singular large fan at each end of the housing 20, and reduced repair and maintenance costs. In some embodiments, the use of eight or more small or moderately-sized fans (i.e., four or more fans at each end of the housing) can allow for the use of ¼ horsepower (hp) electric motors for each fan, compared to, for example, 20 hp motor for one or two large fans at each end. Additionally, smaller fans may allow for the use of 120 volt single phase electricity instead of less common 220 volt or 440 volt three phase electricity. However, this does not preclude the ability to use large fans on 120 volt single phase electricity, such as with the fans shown in the embodiment of FIG. 1.

Smaller fans may also be advantageous from a cost perspective. Smaller fans may be significantly less expensive than large fans for various manufacturing reasons. In cases where smaller fans are less expensive, the usage of the small fans can provide for reduced initialization costs by lowering the capital expense requirement to purchase and install the water condensation apparatus 10. For example, it may be that an embodiment utilizing eight fans—four at each end—lowers the cost of the fans by 90% compared to an embodiment with two large fans—one at each end—for a standard ship-board cargo container dimensioned housing. Four or more small fans at each end can be contemplated in order to balance airflow and cost requirements.

The usage of smaller fans can also provide for easier repair or replacement of fan components. Replacement parts, including an entire fan or fan assembly, can be easier to source and install. In the case of a single large fan, it may be necessary to use specialized equipment such as a forklift to move the entire fan from the housing. In contrast, smaller fans may be lighter in weight such that they can be moved by a hoist or crane, or even potentially by hand. The smaller fans can also make it easier to keep replacement parts stored on hand for quick repairs.

Additionally, in some embodiments, multi-speed or variable speed motors can be used for the plurality of fans 30a, 30b, 30c, 30d. With variable speed motors, the fan speeds can be set to accommodate changes in operating conditions. Accordingly, the plurality of fans can be operated at the same speed or operated independently at different speeds. The use of smaller fans with variable speed motors compared to a large fan can allow for faster adjustments to operating conditions with faster rotational spin-up and spin-down times of the smaller fans.

Additionally, by mounting the fans 30a, 30b, 30c, 30d to fan mounting panels, it can easier to move the fans by moving the fan mounting panel to access the other components within the housing 20. The decreased weight of the fan mounting panel and smaller fans may also significantly lower the cost of transportation as well as increase the options for transportation of replacement components, especially in remote locations.

In some embodiments, the fan mounting panels can be sized to each only hold one fan, in which case there can be four air doors for the four fans on one end of the housing. Alternatively, the pivot can be mounted across the top and bottom of the housing, such that the fan mounting panels are oriented as a top panel and a bottom panel, rather than side by side with the vertical pivots.

Figure 8B:
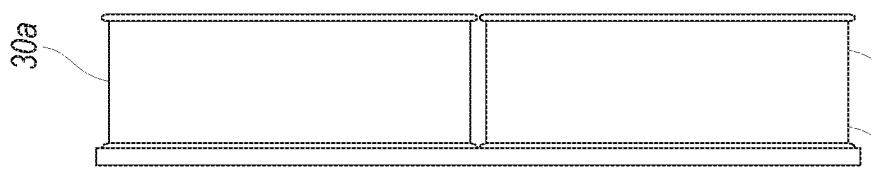
FIGS. 8A and 8B show an embodiment for a fan mounting panel.
Figure 8A:
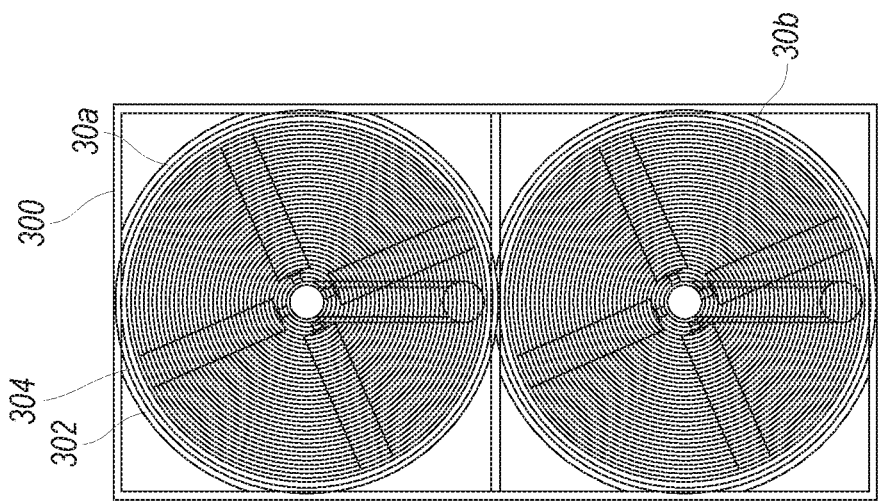

FIGS. 8A and 8B illustrate an exemplary embodiment of a fan mounting panel 300 in accordance with embodiments of this disclosure. The fan mounting panel 300 can include an opening 302 sized and shaped for the fan mounting panel 300 to couple with a fan mounting bracket 304 and a fan 30a, 30b, 30c, 30d. In an exemplary embodiment, the pivoting fan mounting panel can have two openings 302 to accommodate two fans 30a, 30b. The fan mounting panel 300 can be made from a suitable material chosen from metal, wood, or composite to support the fans. For example, the fan mounting panel 300 can be substantially made from steel sheet. Alternatively, the fan mounting panel 300 can include a frame structure, made of metal, wood, or composite, and a door skin covering the frame structure.

The dimensions of the fan mounting panel 300 of FIGS. 8A and 8B can correspond to approximately half of the cross section of the housing 20. In this way, instead of needing to remove the entire weight of the assembly of a single large fan dimensioned for the housing 20, servicing can be done by removal of an individual fan mounting panel and its associated fans. By doing so, the weight of the components can be less than having to remove four or more fans simultaneously, or one large fan. The fan mounting panel 300 may be further reduced in size to decrease the weight for removal and servicing of fans. For example, the fan mounting panel 300 shown in FIGS. 8A and 8B can be further divided into two pivoting panels, each holding one fan. In such an embodiment, there can be four panels with one panel for each fan, each panel corresponding to approximately a quarter of the cross section of the housing 20.

In other embodiments, where other numbers of a plurality of fans are provided, the fan mounting panel 300 can be sized to mount one or more fans per fan mounting panel 300 as suitable for weight limitations for servicing. By decreasing the size of the fan mounting panel 300 and the fans, the weight of the components can be reduced such that heavy machinery is not needed for servicing. With heavier components, it may be necessary to use a forklift or other machine, whereas a smaller assembly may be removable from the housing 20 manually or with simple machines.

FIG. 8B illustrates a side plan view of the pivoting fan mounting panel as described with respect to FIG. 8A. In some embodiments, the fans 30a, 30b can be mounted to one side of the fan mounting panel 300 by way of the fan mounting bracket 304.

Figure 9:
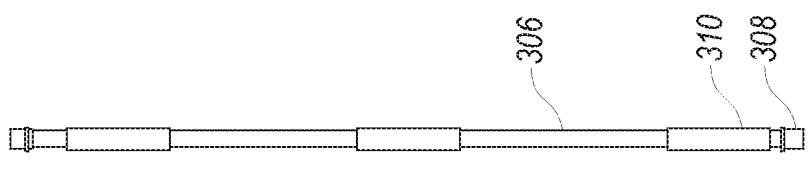
FIG. 9 shows an embodiment of a mounting bar or hinge for mounting the fan mounting panel to the housing.

FIG. 9 illustrates an embodiment of a mounting bar 306 or hinge for pivotably mounting the fan mounting panels 300 to the housing 20. The mounting bar 306 can comprise first and second opposed end sections 308, each of which is configured to fix the mounting bar 306 to the housing. The mounting bar 306 can be mounted to the housing at the first and second end sections 308 through conventionally known components. For example, the housing may have a protrusion sized and shaped to accept and retain one of the first and second end sections 308. In some embodiments, the first and second end sections 308 can include a flange mounting plate (not shown) for mating and fastening to the housing, such as by way of adhesive or fasteners.

In some embodiments, the mounting bar 306 can be a solid, integrally-formed piece. The mounting bar 306 can be sized to fit in a corresponding location in the housing 20. In other embodiments, the mounting bar 306 can be made of at least two telescoping rod sections. With the at least two telescoping rod sections, the mounting bar 306 can be easily adjusted by being extended or shortened for installation inside a housing 20 even if there are dimensional tolerance differences between various housings 20.

The mounting bar 306 can have at least one pivot portion 310 for rotatably mounting a fan mounting panel 300 to it. The pivot portion 310 can include a conventional door hinge type connection or other conventionally known hinging components. In some embodiments, the pivot portion 310 can comprise a portion of the mounting bar 306 having a larger cross-sectional diameter than a second portion of the mounting bar 306. The fan mounting panel 300 can have a corresponding through-bore near one of its edges that is sized and shaped to accept the mounting bar 306. In such an embodiment, the fan mounting panel 300 can accept the mounting bar 306 through the through-bore prior to fitment of the mounting bar 306 to the housing 20. These embodiments can allow for rotation of the fan mounting panels 300 about the mounting bar 306 and relative to the housing 20. In the exemplary embodiment of FIG. 9, the mounting bar 306 can have three pivot portions 310 for coupling with the fan mounting panel 300.

In some embodiments, the mounting bar 306 can be made of 2 inch (5 cm) outer diameter tubing. The pivot portion 310 can be tubing having an inner diameter slightly larger than 2 inches (5 cm) to rotate around the mounting bar 306. In some embodiments, the pivot portion 310 can be welded or integrally portioned with the fan mounting panel 300, such that the fan mounting panel can be rotatably mounted to the mounting bar 306 through the pivot portion 310.

In some embodiments, the first and second end sections 308 can include a portion having an inner diameter sized to allow for the mounting bar 306 to rotate about the first and second end sections 308, which are fixed to the housing 20. In such an embodiment, the mounting bar 306 can be fixed relative to the fan mounting panel 300 such that both the mounting bar 306 and the fan mounting panel 300 rotate about the first and second end sections 308 and the housing 20.

According to some embodiments, the mounting bar 306 can include a retaining component (not shown) to prevent the fan mounting panel 300 from moving slidingly along the length of the mounting bar 306. The retaining component may be configured as a clamp, detent, or clip to maintain the position of the fan mounting panel 300 to prevent unexpected movement of the mounting bar 306 if a fan mounting panel 300 is removed from the housing 20.

Figure 10:
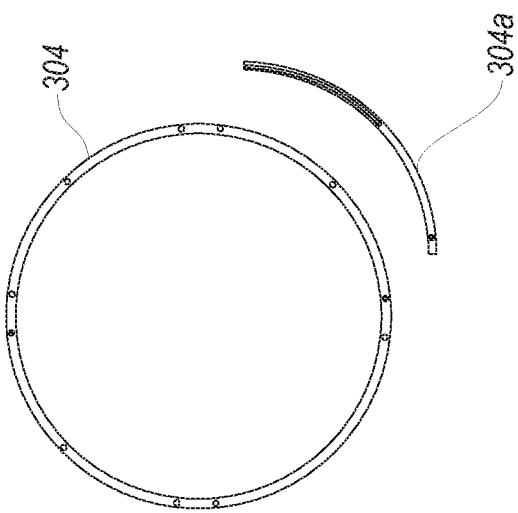
FIG. 10 shows an embodiment of a fan mounting bracket for mounting a fan to a fan mounting panel.

FIG. 10 illustrates an embodiment of a fan mounting bracket 304 for mounting a fan 30a, 30b, 30c, 30d to a fan mounting panel 300. The fan mounting bracket 304, which may advantageously be made of a durable metal, such as aluminum or a corrosion-resistant steel alloy, can be sized and shaped to fit with an opening 302 in the fan mounting panel 300. The fan mounting bracket 304 can also be sized and shaped to accommodate fitment of a fan 30a, 30b, 30c, 30d. As such, the fan 30a, 30b, 30c, 30d can be substantially smaller in outer diameter than a diameter of the opening 302 of the fan mounting panel 300. The fan mounting bracket 304 can be sized to mate with both the fan mounting panel 300 and the fan 30a, 30b, 30c, 30d. In this way, fan mounting brackets 304 can be produced to accommodate different size fans for any given diameter opening 302 of the fan mounting panel 300. This can allow for easy modularization and replacement of the fans without the need to modify the fan mounting panel 300.

In embodiments, the fan mounting bracket 304 can have an outer edge and an inner edge defining an outer shape and an inner opening respectively. In some embodiments, the inner opening may be of a non-circular shape in order to mount fans with non-circular casings. The fan mounting bracket 304 can be attached to at least one of the fans 30a, 30b, 30c, 30d and the fan mounting panel 300 by adhesives and/or fasteners.

In some embodiments, the fan mounting bracket 304 may comprise a plurality of fan mounting bracket segments 304a, which may advantageously be of substantially equal arcuate length. In other embodiments, the fan mounting bracket 304 may comprise a plurality of fan mounting bracket segments 304a of unequal arcuate lengths. For example, the fan mounting bracket 304 can comprise three fan mounting bracket segments 304a, wherein one of the segments is roughly half of the arc of the fan, and wherein two of the segments are each roughly a quarter of the arc of the fan. In such embodiments, the half-arc segment can be installed nearest the wall of the housing, with the two shorter segments installed on the edge adjacent to the other fan mounting panel. This allows for removal and replacement of fans by removing only the two short brackets, greatly simplifying installation and removal or maintenance.

In some embodiments, the fan mounting bracket 304 can have an exterior shape different from the opening 302 of the fan mounting panel 300. For example, the fan mounting bracket 304 may be formed of sheet metal and have a generally rectangular shape with two openings for mounting two fans instead of only one. As such, the fan mounting bracket 304 may extend over two openings 302 of the fan mounting panel 300. This can simplify the mounting process by reducing the number of components needed to mount two or more fans to the fan mounting panel 300.

In some embodiments, the fan mounting bracket 304 can have a non-circular or non-ring geometric shape to correspond with the opening 302 of the pivoting fan mounting panel 300. For example, the opening 302 of the pivoting fan mounting panel 300 can have a rectangular shape, and the fan mounting bracket 304 can also be defined by a corresponding rectangular shape for fitment with the opening 302.

In some embodiments, the fan mounting bracket 304 can comprise a plurality of fastener studs or through holes aligned along a circumference for mating with the fan mounting panel 300 and one of the fans 30a, 30b, 30c, 30d. In other embodiments, the fan mounting bracket 304 can comprise an arrangement of fastener studs or through holes along a first circumference or outline for mating with the fan mounting panel 300 and a second circumference or outline for mating with the fan, wherein the first outline and the second outline are offset from one another.

FIG. 11 illustrates the embodiment of the water condensation apparatus 10 of FIG. 7, showing the coolant system 70, a lower air control tray 90, a condensate collection tray 92, and a water diversion tray 94, without the condensing section 50 described above. The lower air control tray 90, the condensate collection tray 92, and the water diversion tray 94 are further described below with respect to FIGS. 12-14. Generally, the lower air control tray 90, the condensate collection tray 92, and the water diversion tray 94 can be understood as a condensation collection system. The condensation collection system can be sized and shaped to cover a footprint of a condenser section 50 such that condensation from the condenser section 50 is collected by the condensation collection system. In the exemplary embodiment, the lower air control tray 90 is fixed inside the housing 20 to the bottom interior surface thereof (or housing "floor"). A bottom side of the condensate collection tray 92 can be attached to a top side of the lower air control tray 90. The condensate collection tray 92 can be positioned for fitment of the condenser section above the condensate collection tray 92, such that condensate can be collected by a top side of the condensate collection tray 92.

Figure 14:
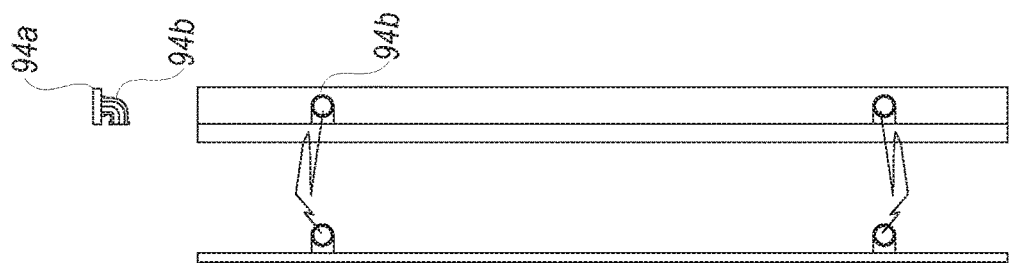
FIG. 14 shows side, top, and end plan views of a water diversion tray.
Figure 13:
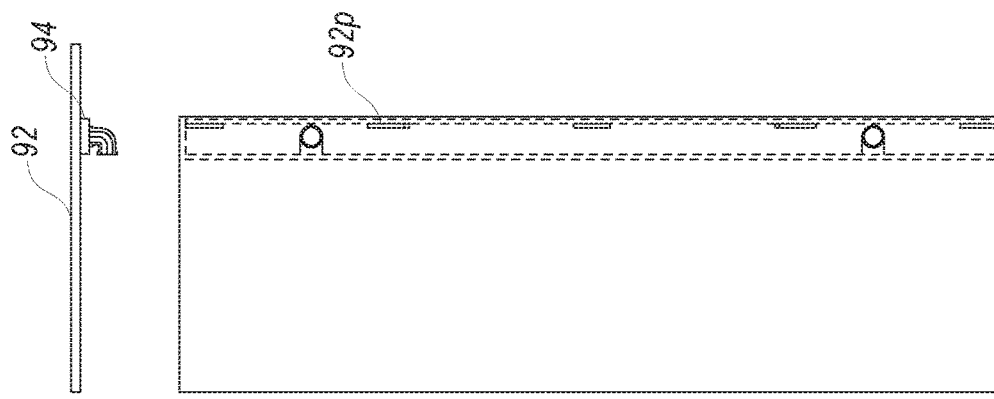
FIG. 13 shows side, top, and end plan views of a condensate collection tray.
Figure 12:
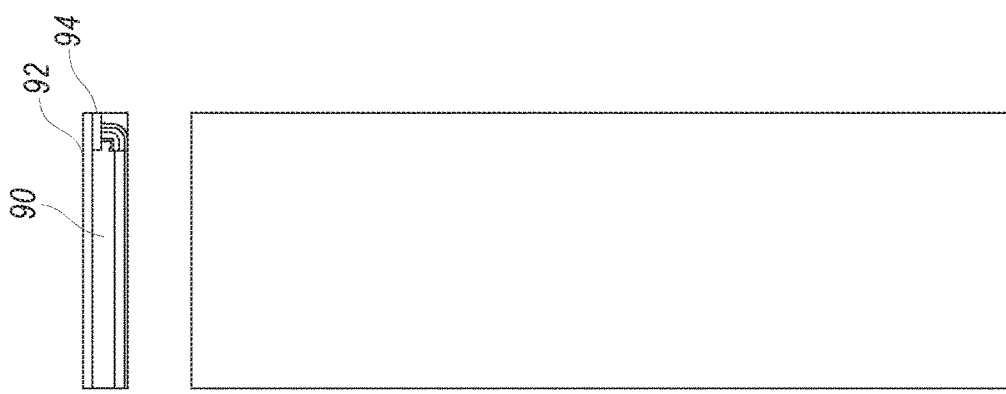
FIG. 12 shows side, top, and end plan views of a lower air control tray.

Additionally, as shown in FIGS. 12-14, the water diversion tray 94 can be attached to the bottom side of the condensate collection tray 92. The condensate collection tray 92 can have a through-hole or port connecting to the water diversion tray 94. The water diversion tray can be connected to the collection piping system 80, such as that shown in FIG. 5, serving as a condensate outlet, which may also comprise rigid and flexible plumbing elements to deliver condensate out of the housing 20 and into a storage unit, such as a tank or reservoir. In some embodiments, the condensate may be directed to a purification apparatus or device before entering the storage tank or reservoir. Rigid plumbing elements (e.g., metal or PVC pipes) can be provided inside the housing 20, and a combination of hard plumbing and flexible plumbing, comprising pipes, hoses, and quick disconnect couplings can be provided outside the housing 20. Pumps can be located inside or outside the housing 20 to pump the condensate out of the housing 20 to a water storage facility or a water-using system or apparatus.

Also, the coolant system 70 of the water condensation apparatus 10 can include a supply line 70a, a return line 70b, a supply header 72, and a return header 74, as discussed above with reference to FIG. 2. The supply header 72 can supply coolant fluid from a coolant source to the supply line 70a. The supply header 72 can split or branch off into multiple separate connections to connect to multiple supply lines 70a. The supply lines 70a can be connected to the condenser section 50, as shown more clearly in FIGS. 15 and 16. The supply header 72 can have a diameter larger than the supply line 70a and the cooling tube 53 of the condenser section 50, so as to be able to supply sufficient coolant fluid to the condenser section 50. After the coolant fluid has circulated through the condenser section 50, the coolant fluid is output to the return header 74 by way of the return line 70b. The return header 74 can have a diameter larger than the return line 70b and the cooling tube 53 of the condenser section 50, so as to be able to provide sufficient flow to evacuate or return coolant fluid from the condenser section 50.

As shown in FIG. 11, the supply header 72 and return header 74 are arranged on the floor or bottom side of the housing 20, and they branch out towards supply lines 70a and return lines 70b in an upward direction. By having the supply header 72 and the return header 74 arranged on the bottom side of the housing 20, the coolant system has a natural state of drainage of the coolant during shut down due to gravity.

In alternative embodiments, the supply header 72 and return header 74 can be arranged on across a top side of the housing 20, or an overhead position. By suspending the supply header 72 and the return header 74, the elevated position can provide increased protection from accidental damage to the supply header 72 and the return header 74 by maintenance personnel when servicing the water condensation apparatus 10. The overhead position can be less susceptible to contact by the maintenance personnel as well as less susceptible to damage from accidentally dropping service equipment. In order to provide for drainage of the coolant from the supply header 72 and the return header 74 during shutdown, at least one valve (not shown) to control coolant flow and a drain connection can be provided to the supply header 72 and the return header 74.

Furthermore, in embodiments of the coolant system 70, at least one of the supply line 70a, the return line 70b, the supply header 72, and the return header 74 can have at least one valve (not shown) to control the flow of coolant through any given portion of the coolant system. In this way, coolant flow can be shut off to specific portions of the condenser section 50. This can allow for a defective portion of the condenser section 50 to be isolated without stopping continued operation of the water condenser apparatus 10. Additionally, in some embodiments, the coolant flow can be shut off to specific portions of the supply line 70a, the return line 70b, the supply header 72, and the return header 74, such that a defective portion can be isolated and replaced or repaired.

FIGS. 12-14 illustrate side, top, and end views of the condensation collection system comprising the lower air control tray 90, the condensate collection tray 92, and the water diversion tray 94. FIG. 12 illustrates side, top, and end plan views of a lower air control tray 90.

In the exemplary embodiment, the lower air control tray 90 is fixed inside the housing 20. A bottom side of the lower air control tray 90 can be fixed to the bottom side of the housing 20.

In some embodiments, the lower air control tray 92 may have a width substantially equal to the width of the interior of the housing 20.

The lower air control tray can be made of a suitable material, including metal, wood, or composite. In some embodiments, the lower air control tray 90 can be made from 12 gauge stainless steel or galvanized steel sheet coated with corrosion resistant enamel or HDPE coating. In some embodiments utilizing 12 gauge stainless steel or galvanized steel sheet, the lower air control tray 90 can be formed by folding at least two opposite edge portions of the steel sheet perpendicular to a central portion of the steel sheet, thereby defining a standoff or cavity.

A bottom side of the condensate collection tray 92 can be attached to a top side of the lower air control tray 90. Additionally, as shown in FIGS. 12-14, the water diversion tray 94 can be attached to the bottom side of the condensate collection tray 92 and can be in the cavity defined by the steel sheet. The condensate collection tray 92 can have a through-hole or port connecting to the water diversion tray 94. The water diversion tray can be connected to the collection piping system 80, such as that found in FIG. 5, serving as a condensate outlet, which may also comprise rigid and flexible plumbing elements to deliver condensate out of the housing 20 and into a storage unit, such as a tank or reservoir.

Although the exemplary lower air control tray 90 is rectangular in cross sectional shape when viewed from the top plan view, the lower air control tray 90 can be shaped differently to provide a footprint under the condenser section 50 to collect condensation.

As such, the lower air control tray 90 can control airflow around a base of the condenser section 50. The lower air control tray 90 can also provide structural support for the combined weight of the condensing section 50, coolant, plumbing, and other various components. The lower air control tray 90 also provides a cavity or space sufficient for the water diversion tray 94 and plumbing necessary to transport the produced condensation from the condenser to storage.

FIG. 13 illustrates side, top, and end plan views of a condensate collection tray 92. A bottom side of the condensate collection tray 92 can be attached to a top side of the lower air control tray 90. The condensate collection tray 92 can be positioned for fitment of the condenser section of FIGS. 15 and 16 above the condensate collection tray 92, such that condensate can be collected by a top side of the condensate collection tray 92.

The condensate collection tray 92 can have at least one through-port 92p or through-hole from the top side to the bottom side. In some embodiments, the condensate collection tray 92 can provide a non-level top side when fixed to the lower air control tray 90 and the housing 20, so that condensation will flow towards the through port 92p. In some embodiments, the through-port 92p is a rectangular slit. Alternatively, the through-port 92p can be one of another geometric shape such as a circle or series of circles. Additionally, the condensate collection tray 92 provides additional support for the condenser section 50, and it may collect and direct the produced condensate through ports into the water diversion tray 94 underneath the condensate collection tray 92.

FIG. 14 illustrates side, top, and end plan views of a water diversion tray 94 that can be attached to the bottom side of the condensate collection tray 92. The condensate collection tray 92 can have a through-hole or port connecting to the water diversion tray 94. The water diversion tray 94 can be connected to the collection piping system 80, such as that shown in FIG. 5, serving as a condensate outlet, which may also comprise rigid and flexible plumbing elements to deliver condensate out of the housing 20 and into a storage unit, such as a tank or reservoir.

The water diversion tray 94 can comprise a channel portion 94a and a pipe connection portion 94b. The channel portion 94a of the water diversion tray 94 can be arranged to capture and direct condensate collected by the condensate collection tray 92 and through-ports 92p of the condensate collection tray 92. The channel portion 94a can essentially be a long shallow channel, closed at the ends, with the channel portion 94a in fluid communication with the pipe connection portion 94b to convey condensate from the through-port 92p to the pipe connection portion 94b.

Figure 15:
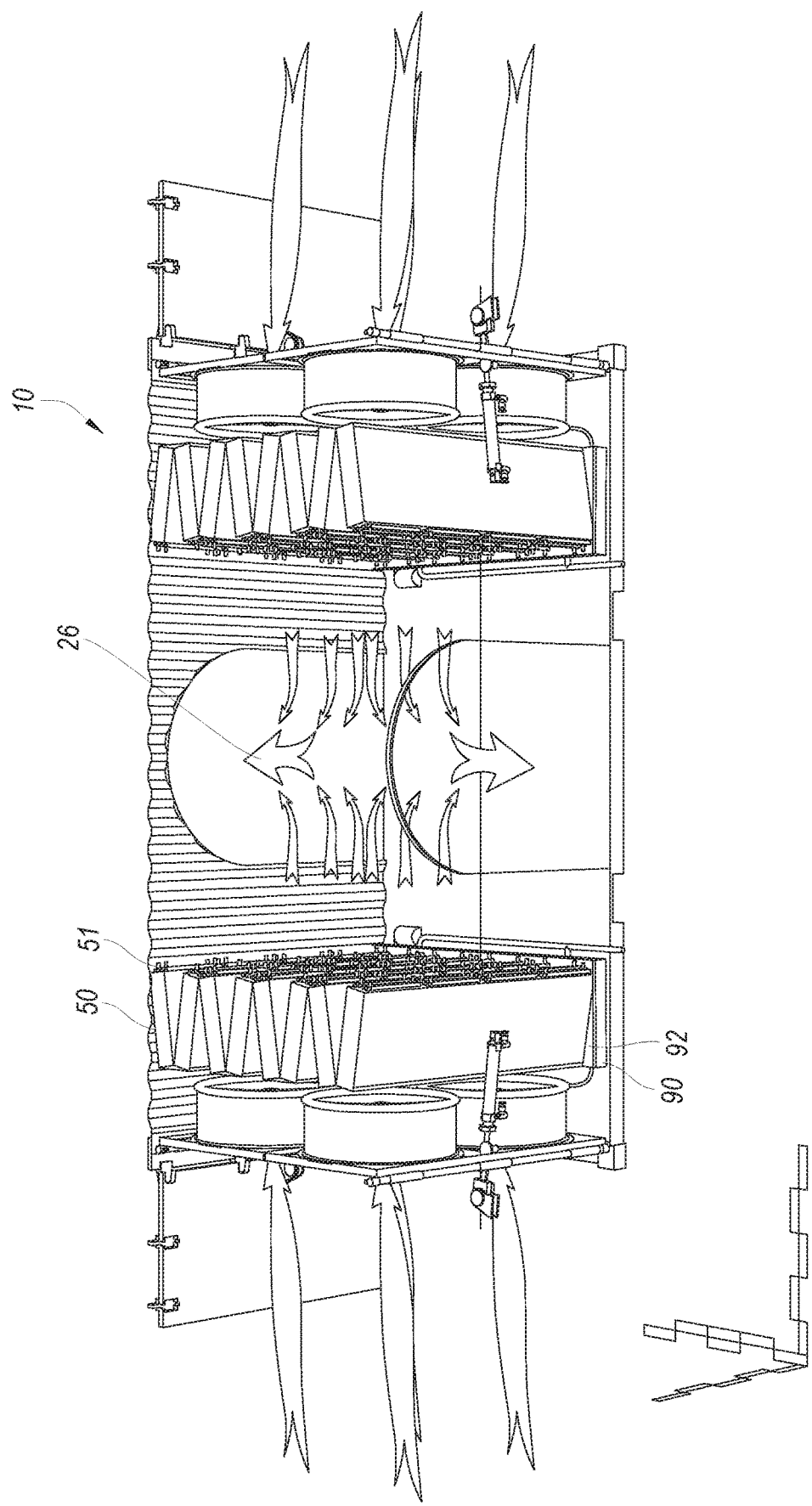
FIG. 15 shows an embodiment of the water condensation apparatus having a zig-zag or "chevron" arrangement for the condenser section without the coolant system.
Figure 16:
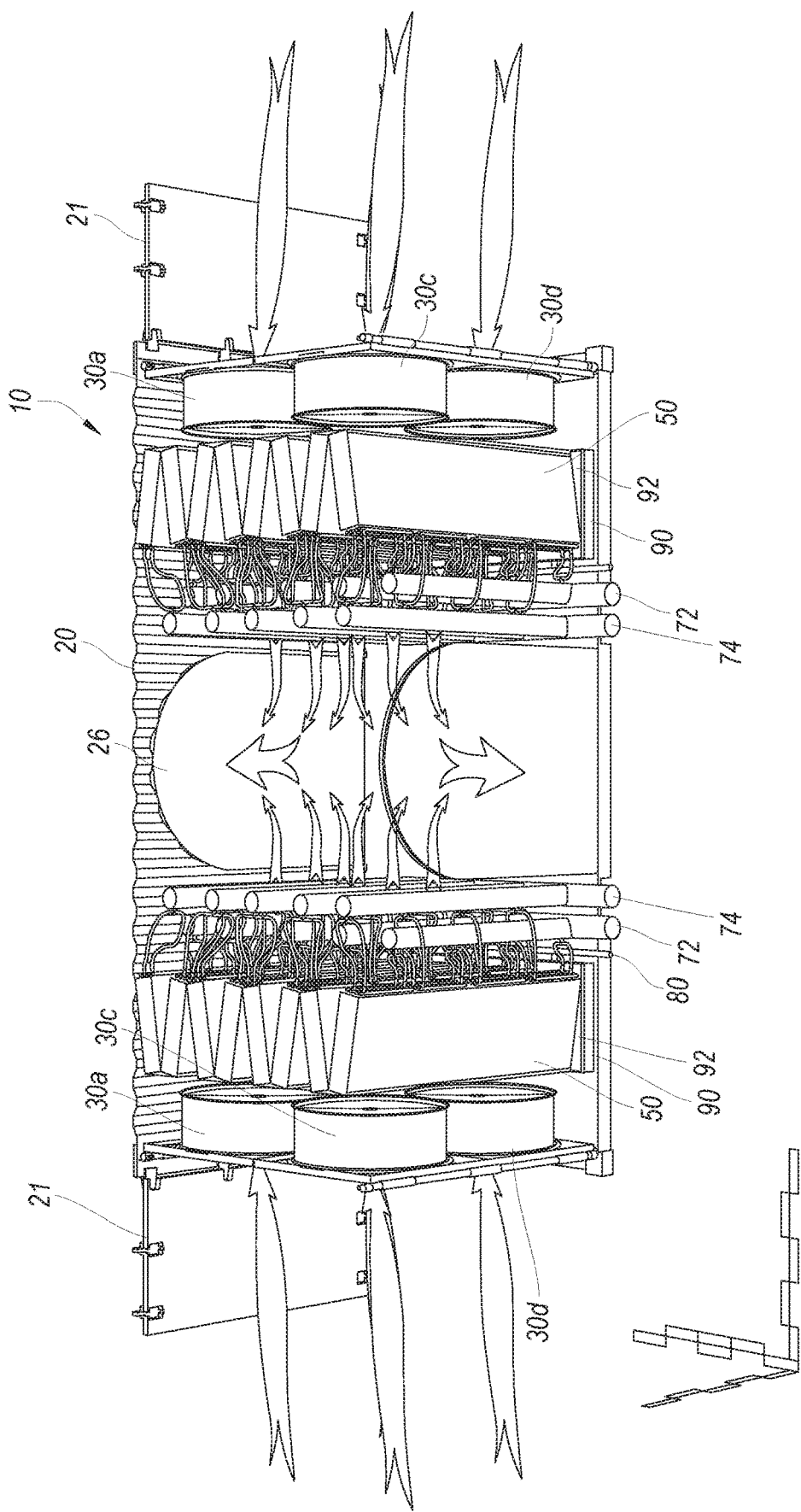
FIG. 16 shows the embodiment of the water condensation apparatus of FIG. 15 including the coolant system.

FIGS. 15 and 16 illustrate an embodiment of the water condensation apparatus or module 10 having a zig-zag or "chevron" arrangement for the condenser section 50. In FIG. 15, the water condensation apparatus 10 is shown without the coolant system 70 components shown and described above with reference to FIGS. 2 and 11, while FIG. 16 includes the coolant system components. In embodiments including a chevron arrangement of the condenser section 50, a bank of condensers is at an oblique angle relative to an adjacent bank of condensers. In this way, the chevron arrangement provides for an accordion type arrangement, or an arrangement similar to the folds in a coffee filter. A chevron arrangement can increase the effectiveness of the condensers. With the chevron arrangement, the condensing surface area of the condenser section 50 can be increased by over 200% compared to a condenser section 50 arranged to be planar and perpendicular to the air flow AF. The increase in the condensing surface area can result in a significant increase in condensate production, such as, for example, an increase of 150 to 180% or more.

Additionally, the chevron arrangement of the condenser section 50 allows for using lower-power fans, and it may also reduce air friction. At the same time, the zig zag arrangement allows for increasing air volume throughput with lower velocity across the condensing surfaces, thereby increasing available moisture and residence time passing across the condensing surface area. Additionally, due to the condensing surfaces being arranged at an oblique angle relative to the air flow AF, less of the air flow is able to pass through the condenser array without coming into contact with the condensing surfaces; conversely, a higher proportion of the airflow comes into contact with the condensing surfaces. Accordingly, the chevron arrangement provides a higher efficiency than when the condenser section 50 is arranged perpendicular to the air flow AF, where the condensing surfaces are inherently parallel to the air flow.

The lower air velocity possible due to the chevron arrangement can also reduce problems with "blinding" or plugging the air passages in the finned heat exchangers as the condensate water flows down the condenser fins and is discharged without being blown to the back (leeward) edge of the fins where it builds up with higher air velocity, forming a ridge due to edge effect and surface tension of the water that can "blind" the lower portion of the individual heat exchanger or condenser panels.

Additionally, the chevron arrangement is also more forgiving of manufacturing variations of the condenser section 50 and the housing 20. Due to the accordion-like feature of the chevron arrangement, the angles between the condenser sections 50 can easily be altered for field fitting to accommodate wider or narrower container housings, variations in condenser section dimensions that may arise in their fabrication, and other unforeseen variables.

Also, the chevron arrangement can increase the structural stability of the condenser section 50. The chevron arrangement can increase structural stability of the entire condenser section 50 as compared to a planar wall, similar to the increased stability of paper formed into corrugations found in cardboard. In some embodiments, the various portions of the chevron arrangement can have end caps (not shown) placed over the upwind sides of the condenser section 50, thereby connecting the corrugation structure, or triangular truss, together. This connection can result in significant horizontal and vertical stability and a high tolerance of tangential forces as may be needed in transportation over the road or during severe storm events in marine based applications.

Figure 17:
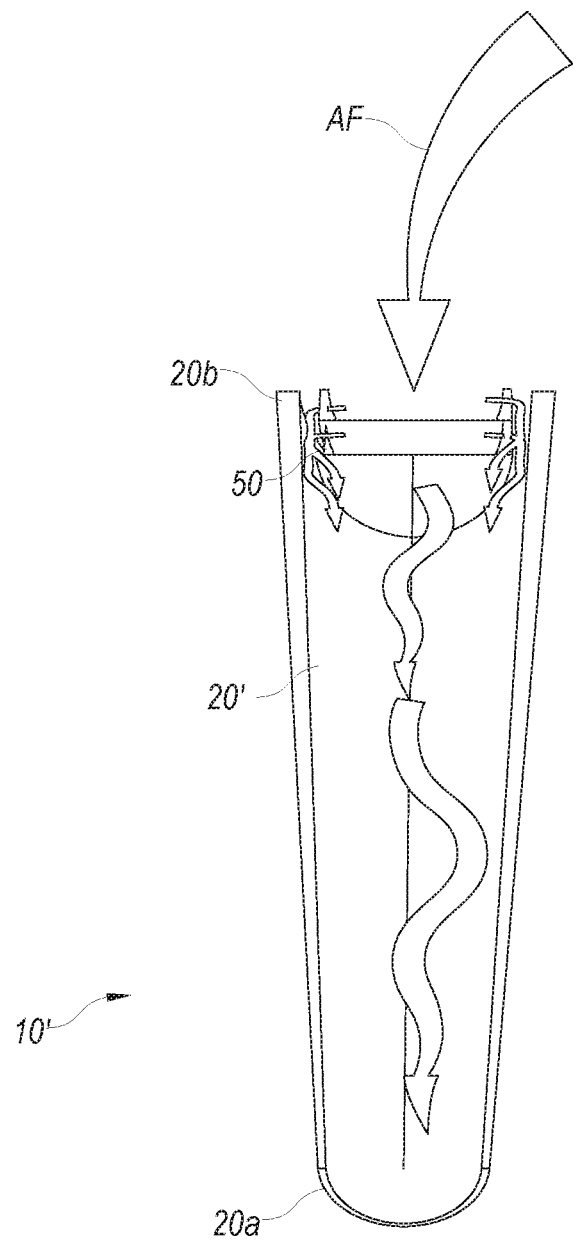
FIG. 17 shows an embodiment of a water vapor condensation apparatus having a vertical "smoke stack" style arrangement.

FIG. 17 illustrates another embodiment of a condensation apparatus 10' having vertical "smoke stack" style arrangement, where air flow is directed through a housing 20' from a top end 20b to a bottom end 20a. In this arrangement, the warm, moist air AF can flow into the top end 20b. At an intermediary position inside the housing 20' can be a condenser section 50'. The condenser section 50' can be arranged nearer to the top end 20b of the housing than the bottom end 20a. Such an embodiment could be used in a factory or power plant smoke stack, or it can be understood as a vertically oriented water condensation apparatus for a smaller footprint.

The condenser section 50' can comprise one or more condensers 51', each having a plurality of condensing surfaces. In some embodiments, the condenser section 50' can be understood as those described above, such as in the embodiments of FIGS. 2-6. The condensers 51' may assume a variety of configurations, such as finned, thermo-siphon, heat pipe, or refrigeration.

The condenser section 50' can be arranged as one or more condensers having a rectangular frame 55 as described above. The plane defined by the rectangular frame can be arranged to be perpendicular to the air flow AF in the smoke stack. Alternatively, one or more condensers can be arranged in the chevron arrangement similar to the arrangement described above with respect to FIGS. 15 and 16.

An arrangement of one or more fans (not shown) can be positioned between the top end 20b and the condensers 51', inside the housing 20', to draw the air into the housing 20'. Alternatively, the arrangement of fans can be positioned downstream of the condensers 51' to pull air through the housing 20'. As cool air will drop relative to warm air, the smoke stack arrangement can aid in moving the air flow through the housing.

In some embodiments, the smoke stack arrangement can also include a pre-cooling section located between the path of the airflow of the moist air between top end 20b and the condensers 51'. The pre-cooling section can be located between the path of the airflow of the moist air between the top end 20b and the condenser section 50'. The pre-cooling section can comprise multiple atomizing nozzles arranged to spray a mist of cooled water into the incoming air stream AF to reduce the temperature of the warm, moist air prior to entering the condensers 51'. Pre-cooling the incoming air stream with cooled water materially enhances the efficiency of the condenser section 50' by increasing the relative humidity, preferably to or near 100%, thereby reducing the moisture-carrying capacity of the incoming air and increasing condensate yield. The cooled water can be a portion of the condensate produced from the condenser section 50' pumped through the atomizing nozzles using an internal pump. Thus, the pre-cooling section can use recirculated cooled water instead of water pumped from outside of the housing 20.

Alternatively, the smoke stack arrangement can be used to direct flow from a bottom end 20a to a top end 20b, such that warm, moist air enters the bottom end 20a and cool air after passing the condenser section 50' flows out of the top end 20b. In embodiments, this can provide for localized air cooling as the cool air drops back around the housing 20' towards the bottom end 20a after it exits from the top end 20b. Flow of the cool air after passing the condenser section 50' out of the top end 20b can also provide for precooling of surrounding air, thereby reducing the warm, moist air entering the bottom end 20a, reducing the moisture-carrying capacity of the incoming air and increasing condensate yield. Flow of the cool air out of the top end 20b can also provide localized air cooling for persons near the smoke stack.

The present disclosure can further provide a method of assembling a water condensation apparatus. An exemplary method can include deploying a water production module comprising a transportable housing defining a first air inlet, a second air inlet, and an air outlet. The water production module can include first and second doors operable selectively to open and close the first and second air inlets, respectively, and at least one water condensation unit located in the housing between the first air inlet and the air outlet, and between the second air inlet and the air outlet. The housing can be configured so that, when at least one of the first and second air inlets is open, at least a portion of an air flow into the at least one open air inlet is passed through the at least one condensation unit and out the air outlet. The method can include positioning the water production module so that warm, humid atmospheric air is introduced into at least one of the first and second inlets. The method can include directing the atmospheric air to pass through the at least one condensation unit to condense liquid water from the atmospheric air through condensation. The method can include collecting the condensed liquid water. The method can include passing at least a portion of the atmospheric out the air outlet.

In all contemplated embodiments the cooling and condensing surfaces may have a mild negative electrical charge induced to attract the water molecules, thereby increasing the affinity of the water to be attracted to the condensing surfaces. A positive charge may be induced into the incoming warm moist air stream as it enters the apparatus to further enhance water's natural tendency to be attracted to negative charges. Simple insulation can be employed advantageously to separate and maintain the relative charges. These charges may variably be induced by alternating current (AC) direct current (DC) or statically induced by the natural movement of the air flow.

Although limited embodiments of a water condensation apparatus, its components, and related methods have been specifically described and illustrated herein, many modifications and variations will be apparent to those skilled in the art. Furthermore, it is understood and contemplated that features specifically discussed for one water condensation apparatus embodiment may be adopted for inclusion with another water condensation apparatus, provided the functions are compatible. Accordingly, it is to be understood that the water condensation apparatus, its components, and related methods constructed according to principles of the disclosed devices and methods may be embodied other than as specifically described herein. The disclosure is also defined in the following claims.

What is claimed is:

1. Apparatus for condensing liquid water from ambient atmospheric air containing water vapor, the apparatus comprising:
   a housing having a first end defining a first air opening, an opposite second end defining a second air opening, and first and second opposed side walls extending between the first and second ends;
   a third air opening in at least one of the first and second opposed side walls;
   a water condensing unit in the housing and configured to receive a flow of ambient atmospheric air through the housing between at least one of the first and second air openings and the third air opening, the water condensing unit being configured to cool the ambient atmospheric air at least to its dewpoint, thereby condensing liquid water from water vapor in the ambient atmospheric air, the water condensing unit comprising a pre-cooling section and a condenser section; and
   first and second door assemblies operable selectively to open and close the first and second air openings, respectively, wherein the first door assembly is at the first end of the housing, and the second door assembly is at the second end of the housing;
   wherein the water condensing unit is located in the housing so that, when at least one of the first and second air openings is open, at least a portion of the flow of air between the at least one of the first and second air openings that is open and the third air opening is passed first through the pre-cooling section and then through the condensing section, whereby water vapor in the portion of the flow of ambient atmospheric air passing through the water condensing unit is condensed as liquid water.

2. The apparatus of claim 1, further comprising a first fan assembly in the housing proximate the first air opening and a second fan assembly in the housing proximate the second air opening.

3. The apparatus of claim 2, wherein the first fan assembly includes at least one fan mounted on a first fan-mounting panel located between the first door assembly and the condensing unit, and wherein the second fan assembly includes at least one fan mounted on a second fan-mounting panel located between the second door assembly and the condensing unit.

4. The apparatus of claim 3, wherein each of the first and second fan-mounting panels is pivotably attached to the housing.

5. The apparatus of claim 1, wherein the condensing unit is a first condensing unit located in the housing between the first air opening and the third air opening, the apparatus further comprising a second condensing unit located in the housing between the second air opening and the third air opening.

6. The apparatus of claim 1, wherein the housing is configured as a ship-loadable rectangular cargo container.

7. The apparatus of claim 1, wherein the housing is a first housing, and wherein the apparatus comprises one or more further housings, each of the further housings being configured to be positioned relative to the first housing and to each other so as to define an arrangement of modular housings, each of the modular housings in the arrangement defining first, second, and third air openings, each of the modular housings in the arrangement including first and second door assemblies operable selectively to close the first and second air openings, respectively, and at least one condensing unit positioned for being contacted by at least a portion of an air flow into at least one of the first and second air openings.

8. The apparatus of claim 1, wherein the condenser section comprises:
   a plurality of coolant-containing conduits configured to cool the ambient atmospheric air in the flow of air at least to its dewpoint; and
   an arrangement of water-collection surfaces arranged and operatively associated with the coolant-containing conduits to collect the liquid water condensed from the ambient atmospheric air by the coolant-containing conduits.

9. The apparatus of claim 8, wherein the condensing section further comprises a condensate collection tray, wherein the condensed liquid water from the ambient atmospheric air is collected by a surface of the condensate collection tray.

10. The apparatus of claim 1, wherein the pre-cooling section of the water condensing unit is fluidly coupled to the condenser section of the water condensing unit so as to receive a portion of the liquid water, and wherein the pre-cooling section is located so that the portion of the flow of ambient atmospheric air is pre-cooled by the received portion of the liquid water before it passes through the condenser section of the water condensing unit.

* * * * *